United States Patent
Kusens et al.

(10) Patent No.: US 10,789,794 B2
(45) Date of Patent: *Sep. 29, 2020

(54) ELECTRONIC ACCESS CONTROL AND LOCATION TRACKING SYSTEM

(71) Applicant: COLLATERAL OPPORTUNITIES, LLC, Wilmington, DE (US)

(72) Inventors: Bruce Howard Kusens, North Miami Beach, FL (US); Michael Kusens, Southwest Ranches, FL (US)

(73) Assignee: COLLATERAL OPPORTUNITIES OF NEVADA, LLC, College Grove, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/739,323

(22) Filed: Jan. 10, 2020

(65) Prior Publication Data

US 2020/0151980 A1    May 14, 2020

Related U.S. Application Data

(63) Continuation of application No. 16/173,845, filed on Oct. 29, 2018, now Pat. No. 10,535,210, which is a (Continued)

(51) Int. Cl.
*G01S 13/06* (2006.01)
*G01S 13/04* (2006.01)
(Continued)

(52) U.S. Cl.
CPC ..... *G07C 9/00309* (2013.01); *G06F 16/9535* (2019.01); *G07C 9/00571* (2013.01); *G07C 9/00817* (2013.01); *G07C 9/27* (2020.01); *G07C 9/28* (2020.01); *H04W 4/02* (2013.01); *H04W 64/00* (2013.01); *G07C 2009/00388* (2013.01); *G07C 2009/00769* (2013.01); *G07C 2209/02* (2013.01); *G07C 2209/63* (2013.01)

(58) Field of Classification Search
CPC ...... G07C 9/00309; G07C 2009/00769; G07C 9/00571; G07C 9/28; G07C 9/20; G07C 2209/63; G07C 2009/00793; G07C 9/00896; G07C 9/27; G07C 9/00174; G07C 2209/64; G07C 9/00944
USPC ........................................................ 340/5.61
See application file for complete search history.

(56) References Cited

U.S. PATENT DOCUMENTS 7,269,427 B2 *  9/2007  Hoctor ...................... G01S 5/06
                                                    342/126
7,600,679 B2 * 10/2009  Kshirsagar ............... G07C 9/28
                                                    235/382

(Continued)

*Primary Examiner* — John F Mortell
(74) *Attorney, Agent, or Firm* — Daniel S. Polley, P.A.

(57) ABSTRACT

A system and method for determining the presence of an individual at a particular spot within a location preferably based on the strength of signals received from beacons assigned to the particular spot by a software application ("App") running on an electronic device of the individual. In one embodiment, certain presence calculations are performed by the App. In another embodiment, the App forwards information regarding the received beacon signals to an electronic identification and location tracking system and the presence calculations are performed by the system.

27 Claims, 17 Drawing Sheets

Determination of Presence at Location – Embodiment C

Related U.S. Application Data continuation of application No. 15/876,758, filed on Jan. 22, 2018, now Pat. No. 10,115,253, which is a continuation-in-part of application No. 15/818,020, filed on Nov. 20, 2017, now Pat. No. 9,997,001, which is a continuation-in-part of application No. 15/627,820, filed on Jun. 20, 2017, now Pat. No. 9,858,741, which is a continuation of application No. 15/286,753, filed on Oct. 6, 2016, now Pat. No. 9,691,206, which is a continuation of application No. 15/055,477, filed on Feb. 26, 2016, now Pat. No. 9,466,163, which is a continuation-in-part of application No. 14/827,222, filed on Aug. 14, 2015, now Pat. No. 9,424,699.

(60) Provisional application No. 62/037,684, filed on Aug. 15, 2014.

(51) Int. Cl.
| | | |
|---|---|---|
| *G07C 9/00* | (2020.01) | |
| *H04W 4/02* | (2018.01) | |
| *H04W 64/00* | (2009.01) | |
| *G06F 16/9535* | (2019.01) | |
| *G07C 9/27* | (2020.01) | |
| *G07C 9/28* | (2020.01) | |

(56) References Cited

U.S. PATENT DOCUMENTS

| | | | |
|---|---|---|---|
| 7,830,250 B2 * | 11/2010 | Huseth | G01S 11/06 340/500 |
| 8,446,249 B2 * | 5/2013 | Gerstenkorn | G07C 9/00309 340/5.2 |
| 8,548,493 B2 * | 10/2013 | Rieger, III | G01S 5/0252 455/456.1 |
| 9,292,963 B2 * | 3/2016 | Liu | G06T 15/205 |

* cited by examiner

FIGURE 1: Registration of Member Device
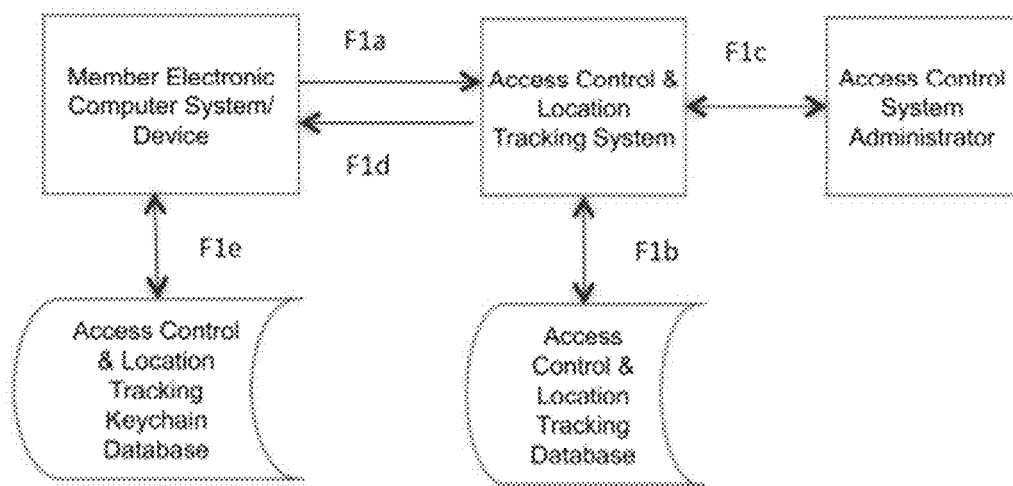
FIGURE 2: Sending Access Key to Guest Device
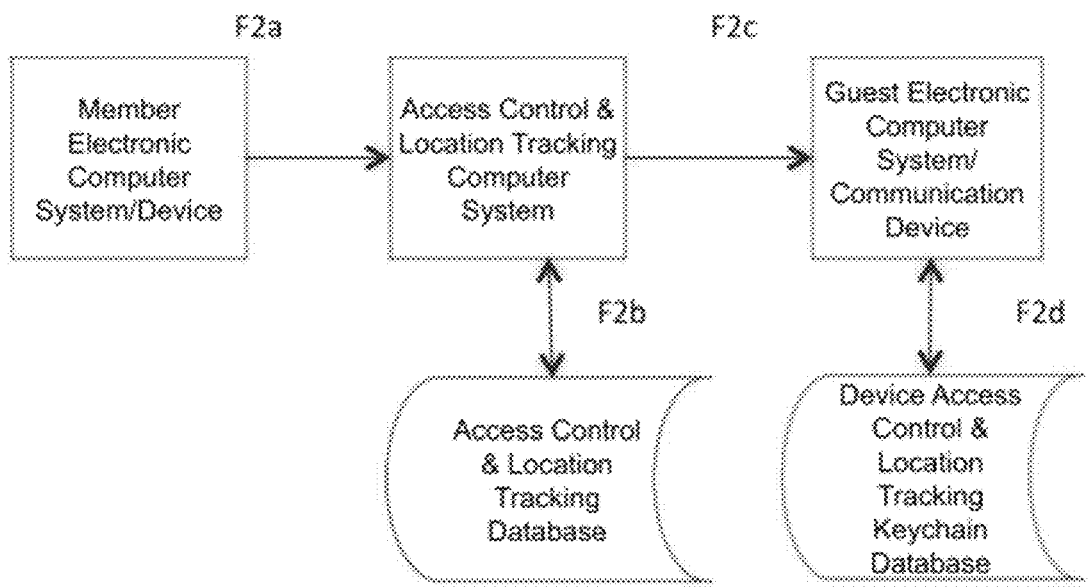

FIGURE 3: Determination of Access Rights
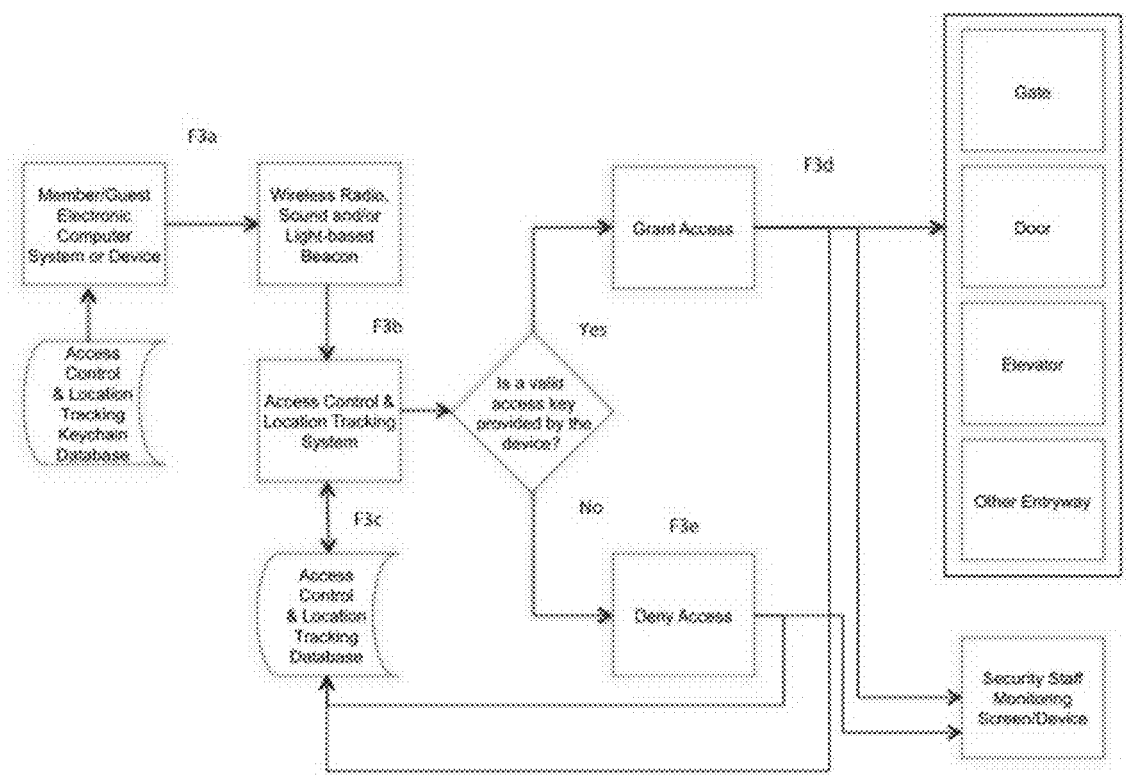
FIGURE 4: Determination of Authorized Location(s)
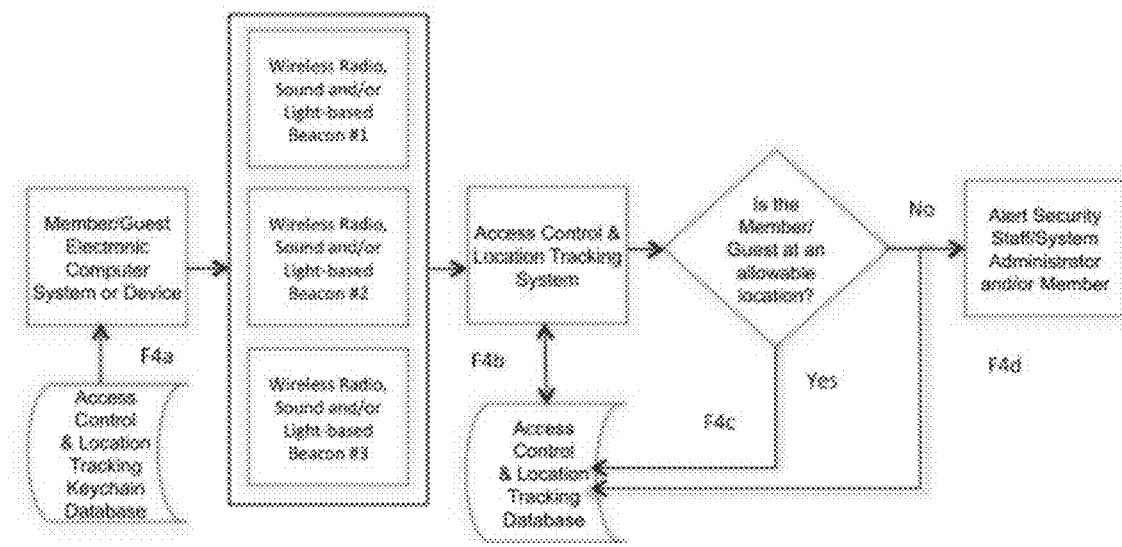

FIGURE 5: Determination of Arrival at Authorized Location(s)
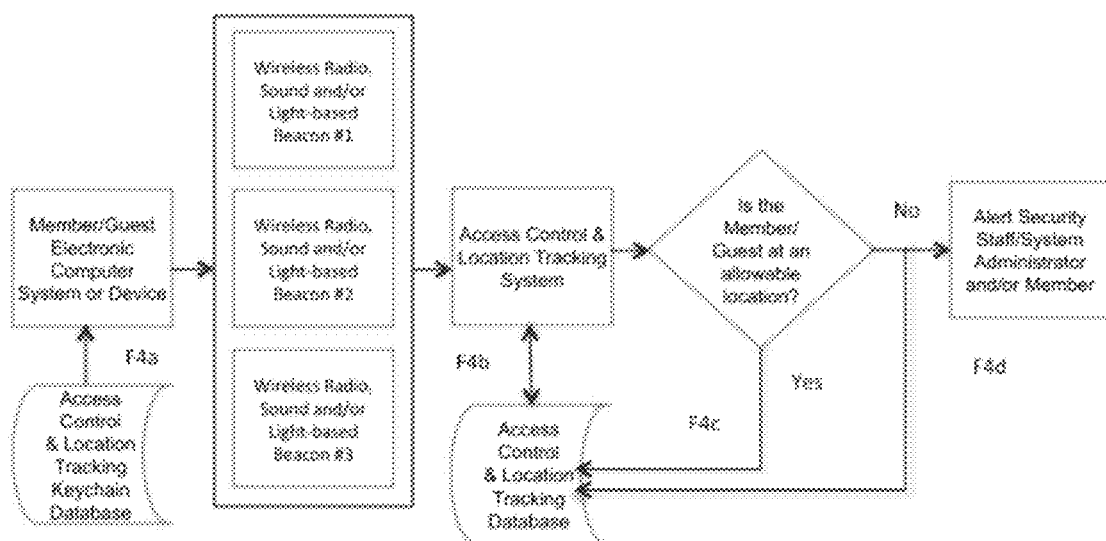
FIGURE 6: Determination of Location and Navigational Support
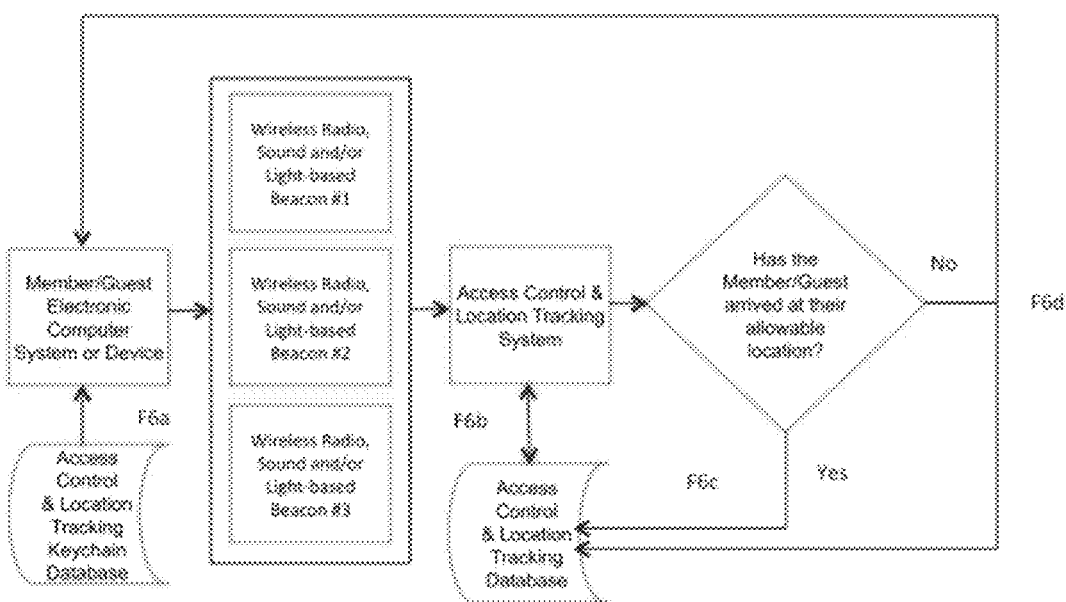

FIGURE 7: Access Control & Notification Rules Engine
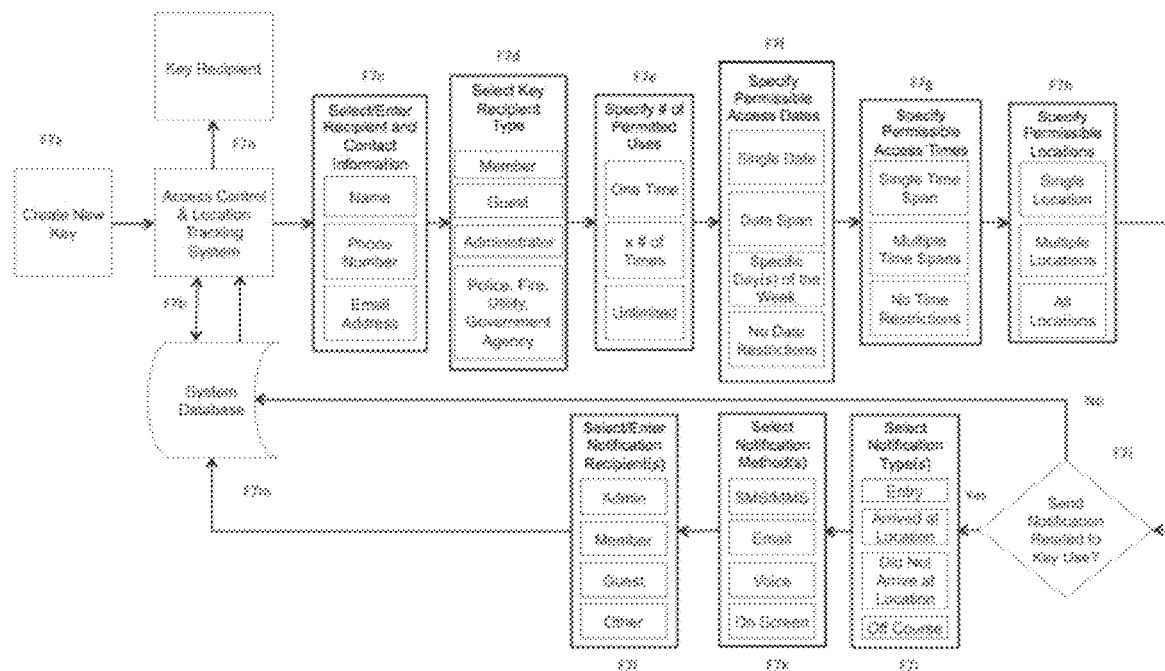
FIGURE 8: Storage of Keys in Keychain Database
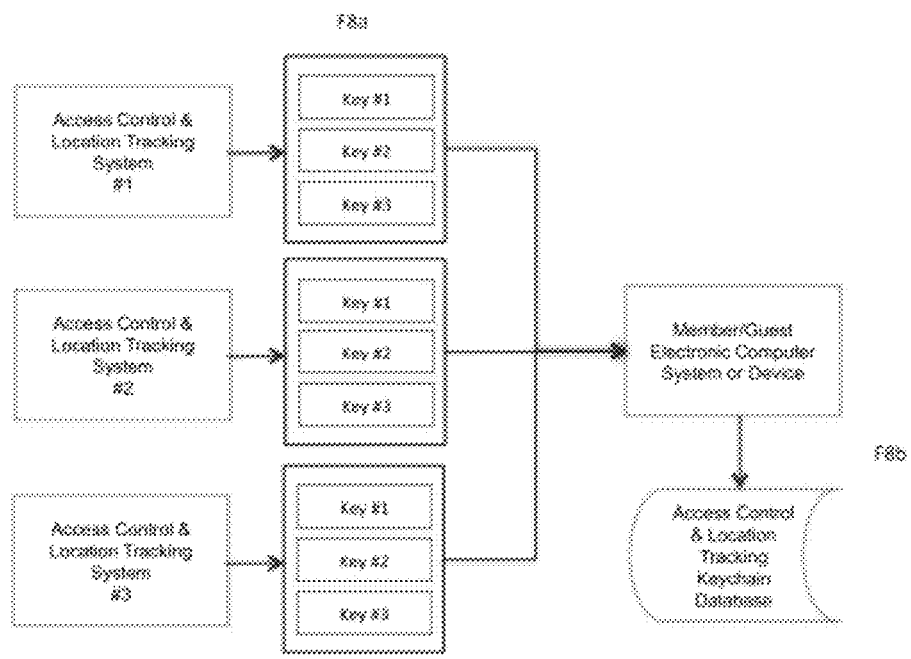

FIGURE 9: Manually Sending Keys from Device to Access Control & Location Tracking System
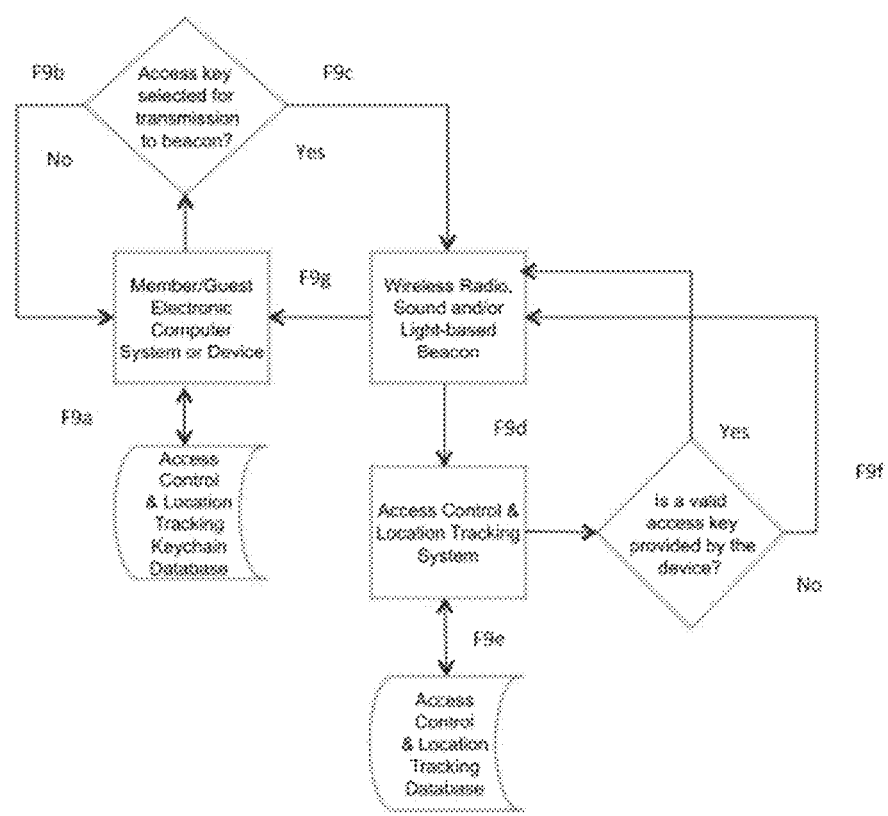

FIGURE 10: Auto-Prompting to Select a Key and Manual Key Selection to Send from Device to Access Control & Location Tracking System
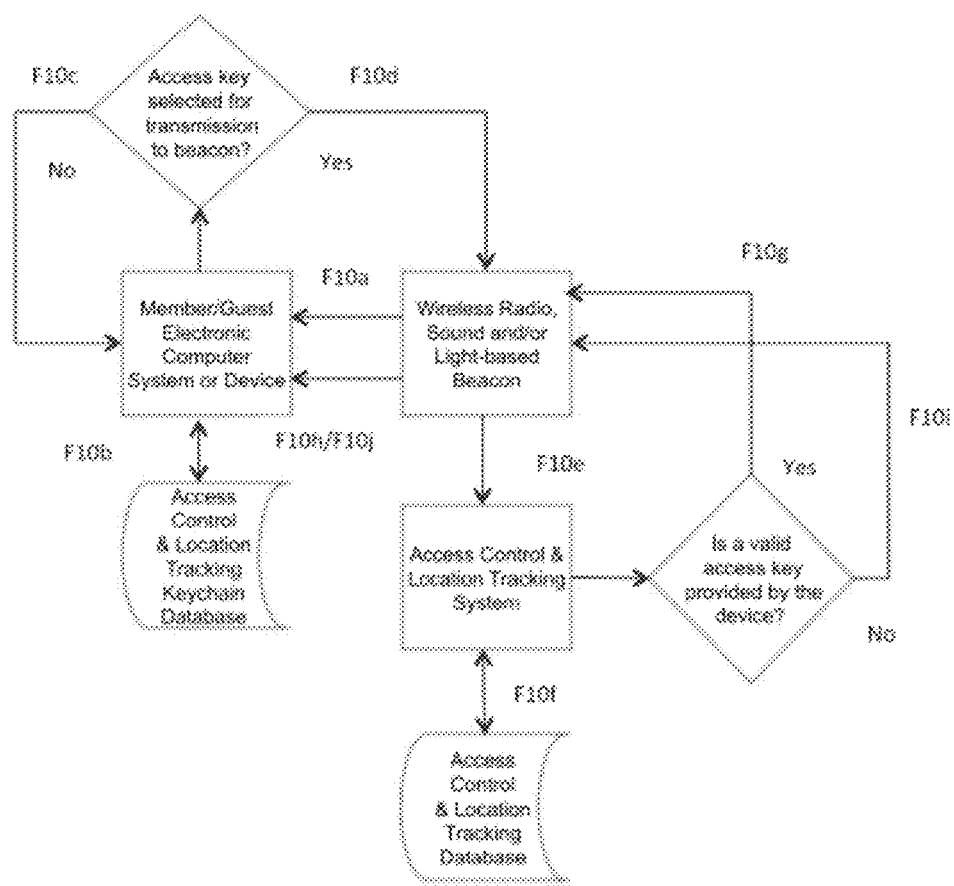

FIGURE 11: Auto-Prompting & Key Selection to Send from Device to Access Control & Location Tracking System
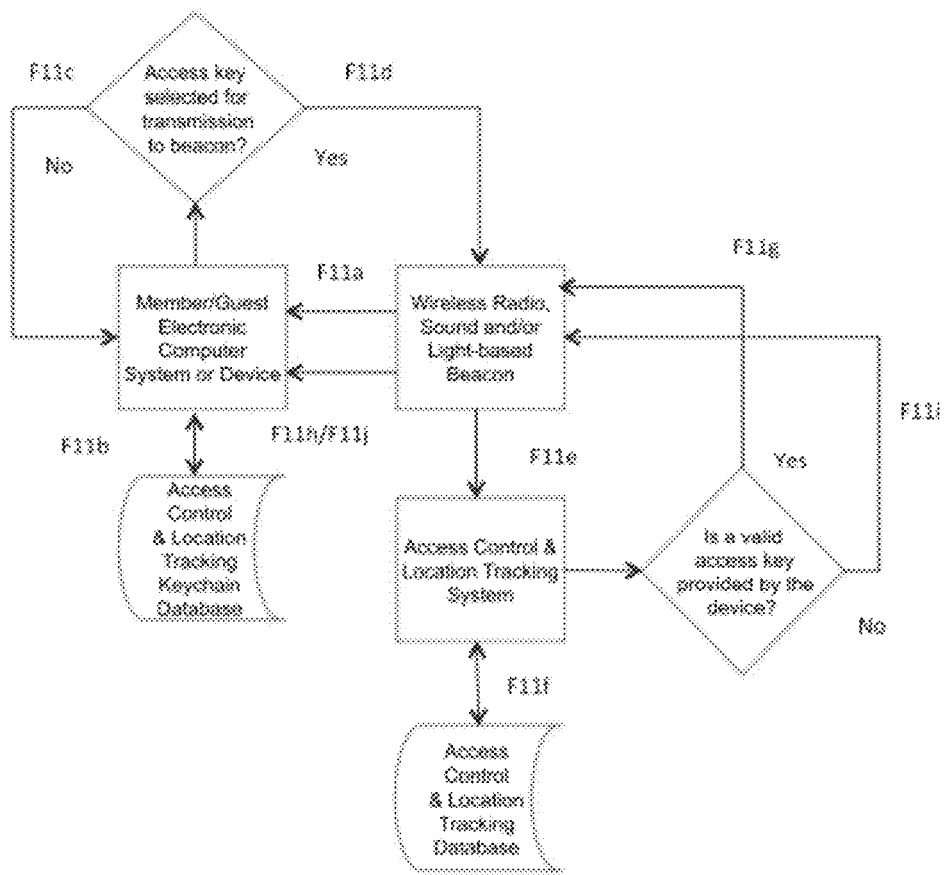
FIGURE 12: Process for a Guest to Request a Key from a Member
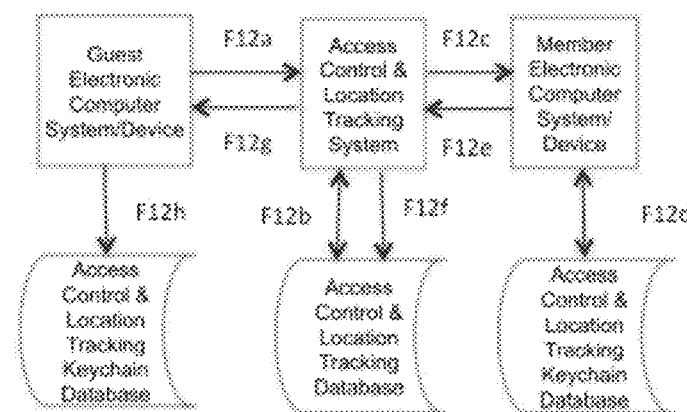

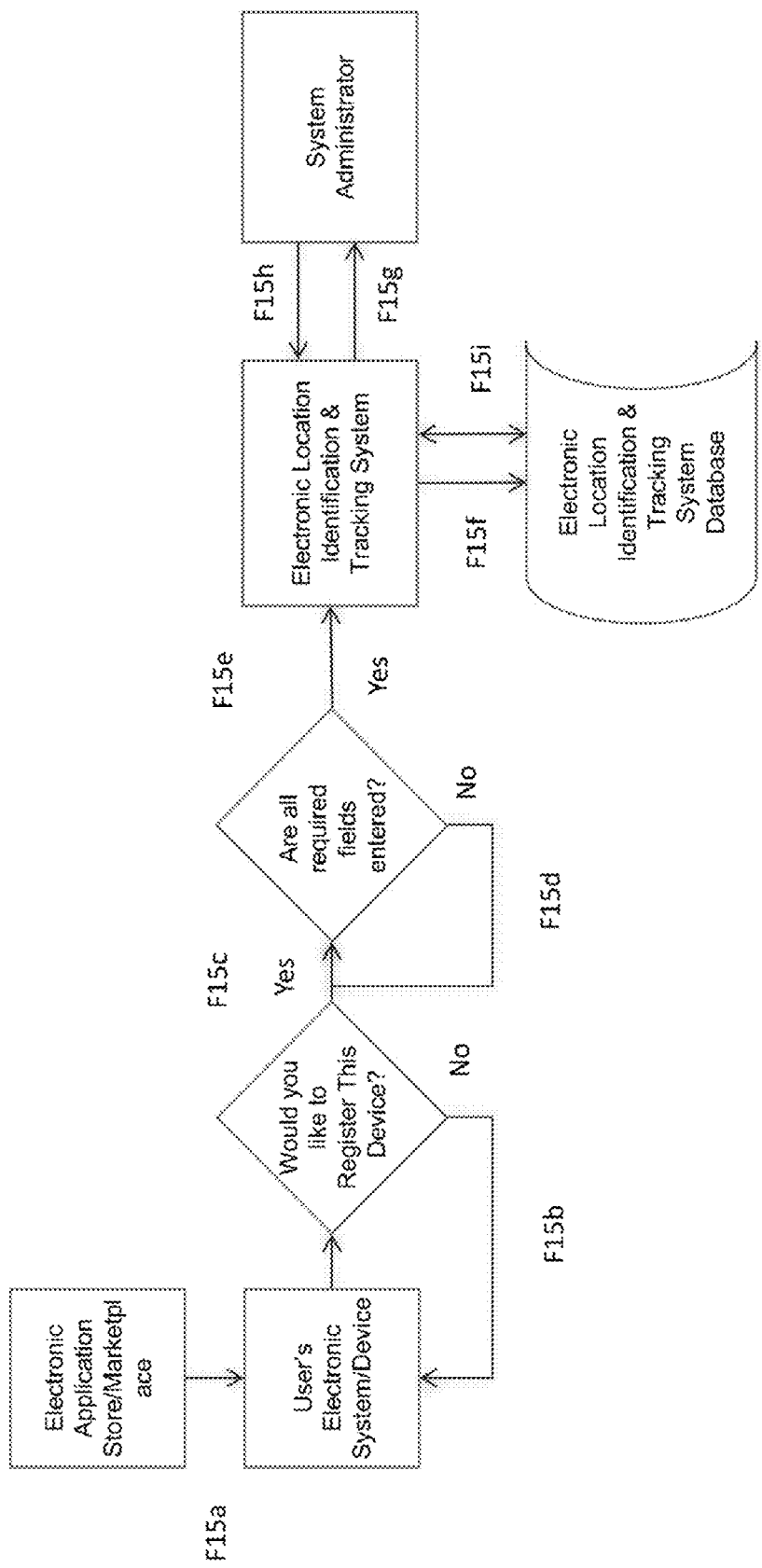
Figure 15: Registration of User's Device

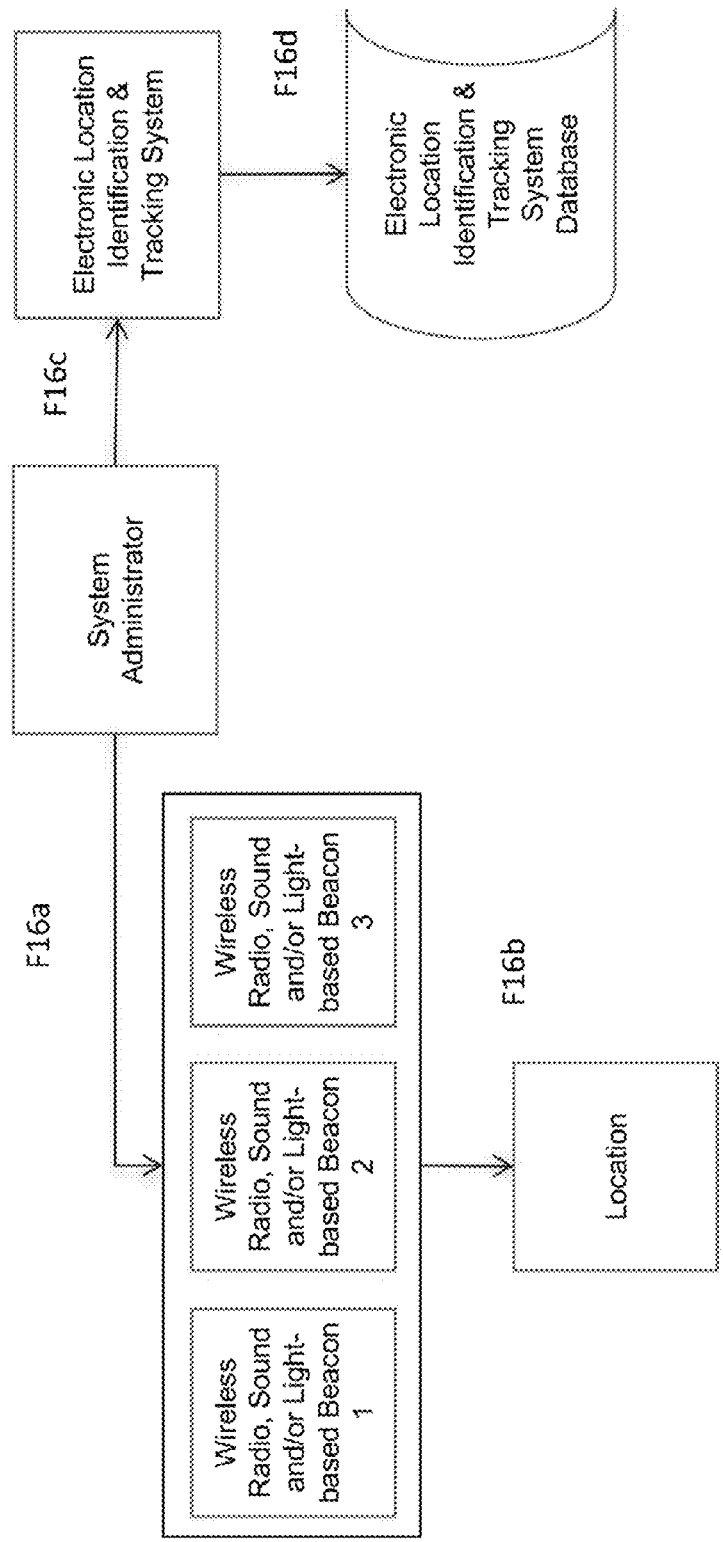
Figure 16: Registration of a Location

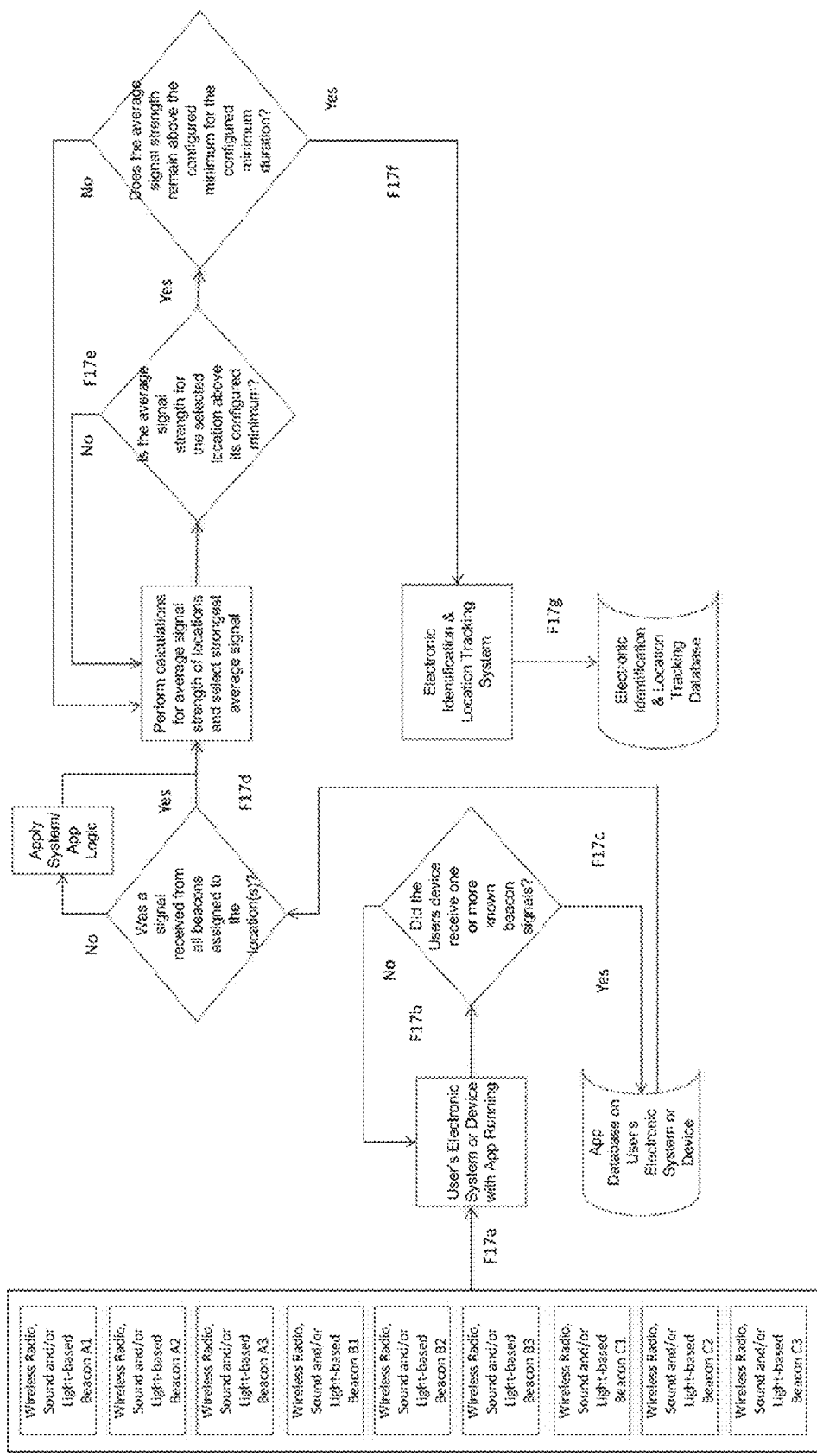
Figure 17: Determination of Presence at Location – Embodiment A

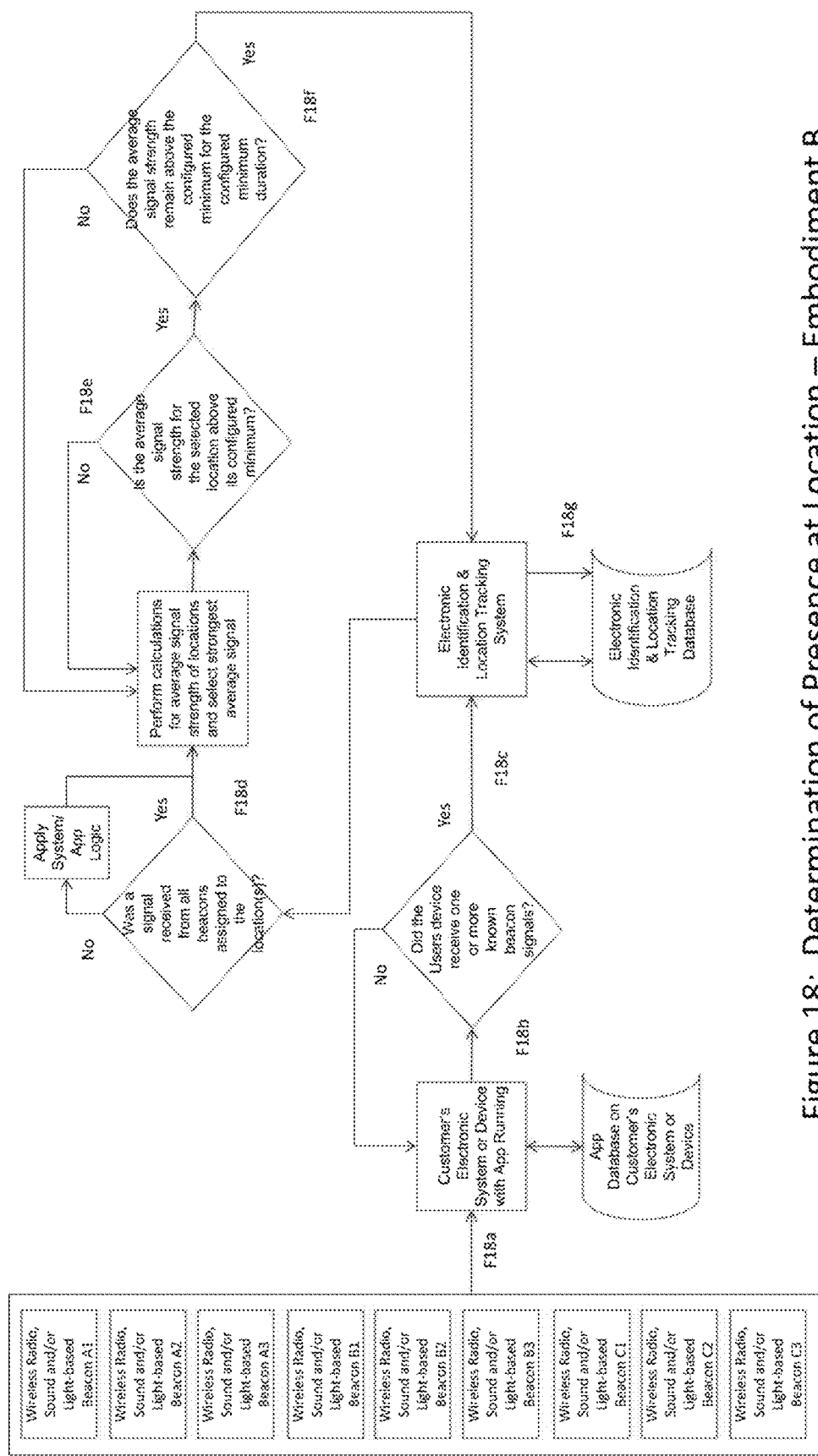
Figure 18: Determination of Presence at Location – Embodiment B

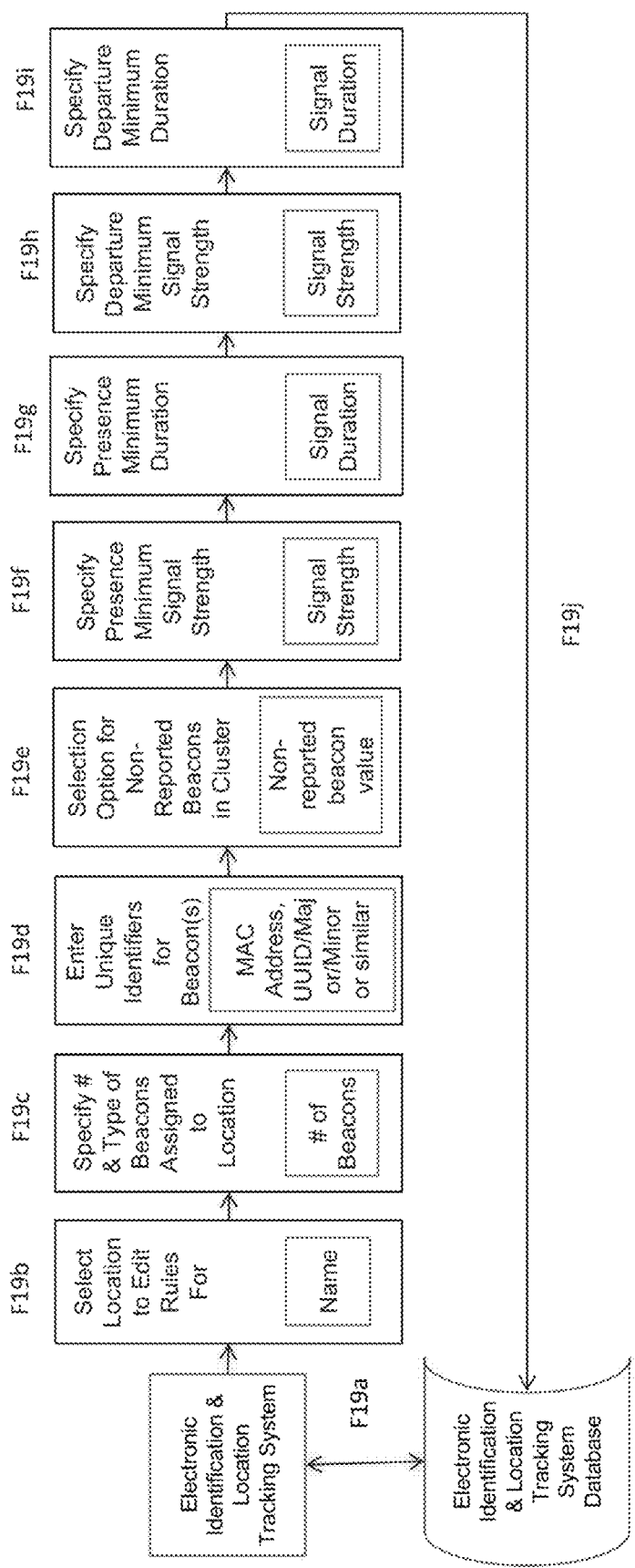
Figure 19: Presence Determination at a Location Rules Engine

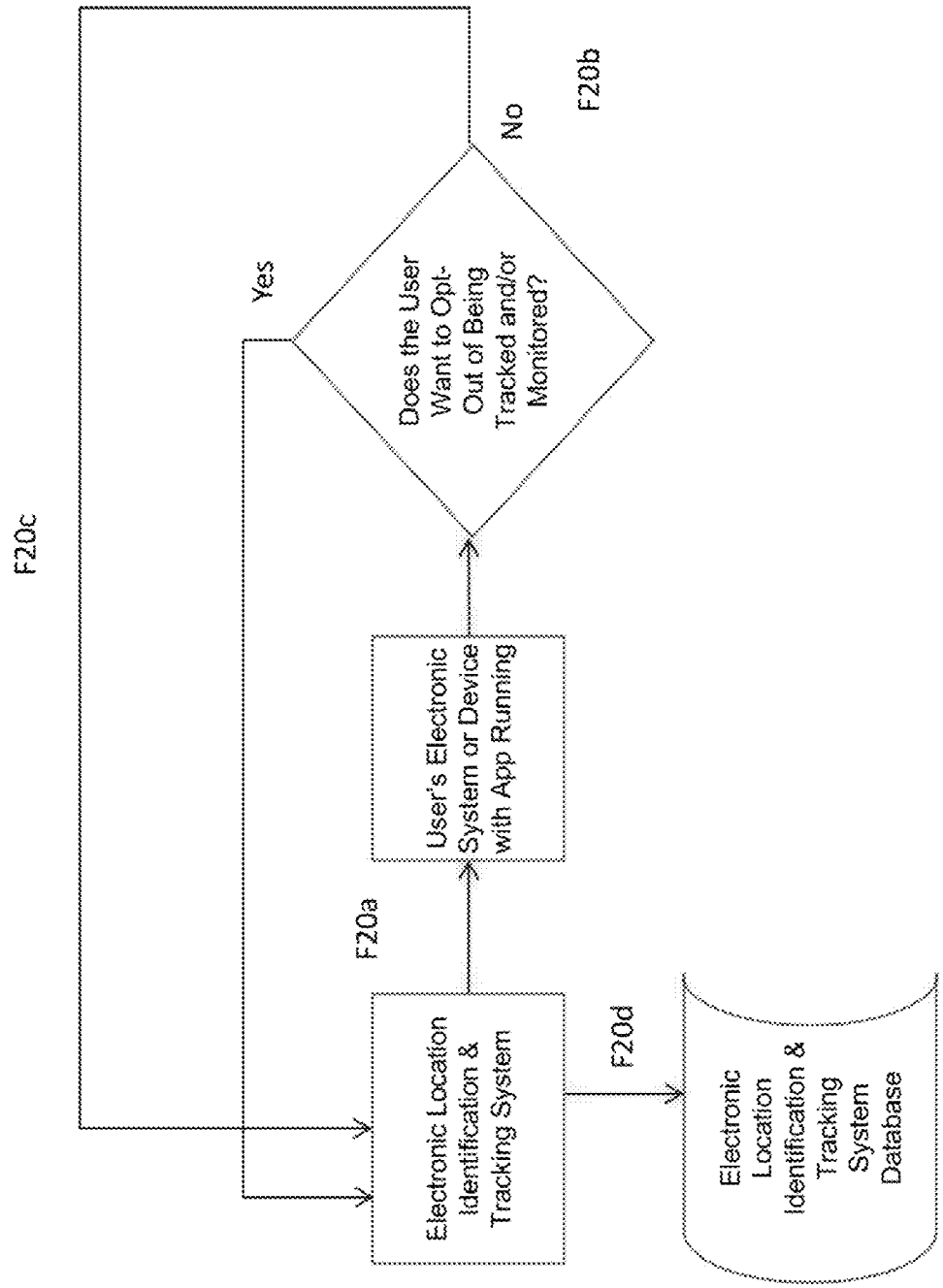

Figure 21: Sample of presence determination with Clustering of Beacons in a Location
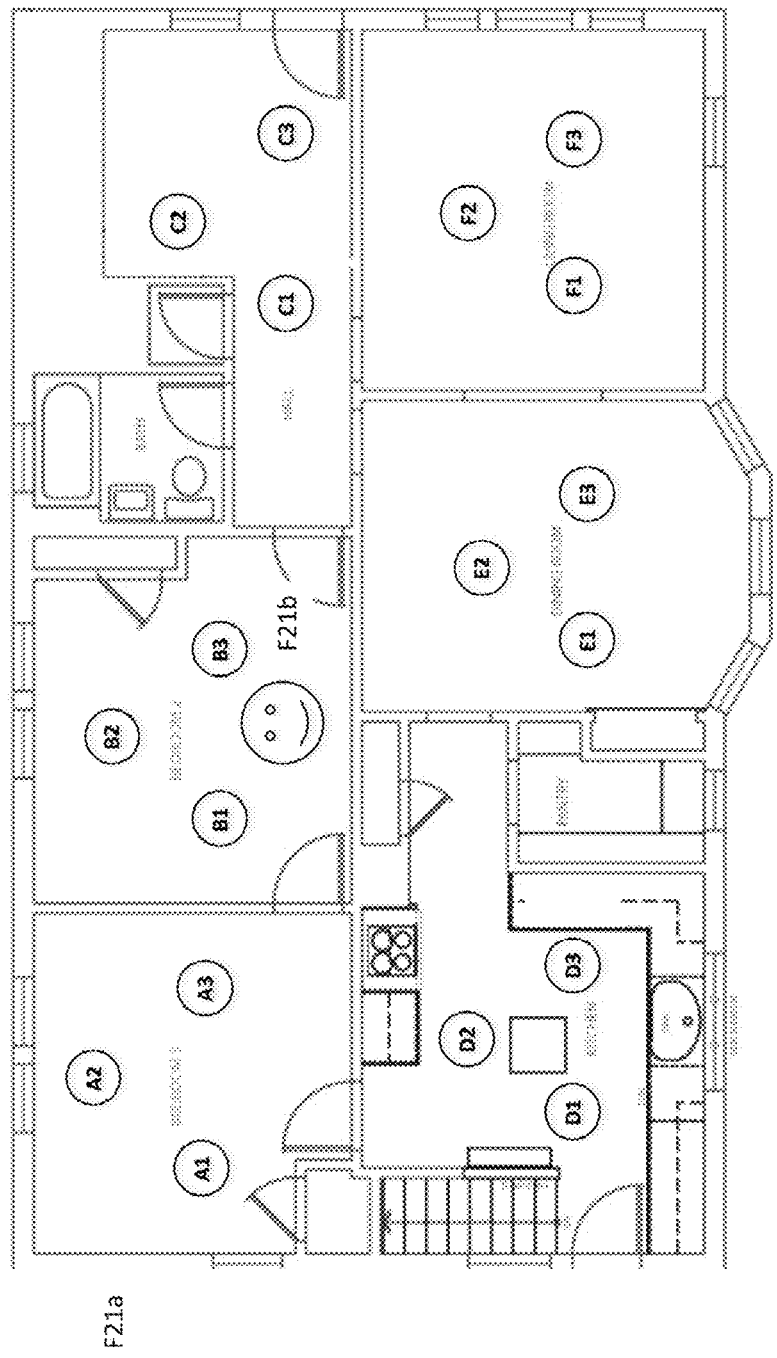
F21c  Signal Strength (RSSI, % or other) Data Received
A1 = -72 dBm    B1 = -49 dBm    C1 = -92dBm    D1 = -91 dBm    E1 = -74 dBm    F1 = -90 dBm
A2 = -70 dBm    B2 = -62 dBm    C2 = -95 dBm   D2 = -85 dBm    E2 = -70 dBm    F2 = -95 dBm
A3 = -678dBm    B3 = -51 dBm    C3 = -98 dBm   D3 = -85 dBm    E3 = -75 dBm    F3 = -97 dBm
AVG = -70 dBm   AVG = -54 dBm   AVG = -95 dBm  AVG = -87 dBm   AVG = -73dBm    AVG = -94 dBm
F21d   Location = Bedroom 2 ('B' Beacons)

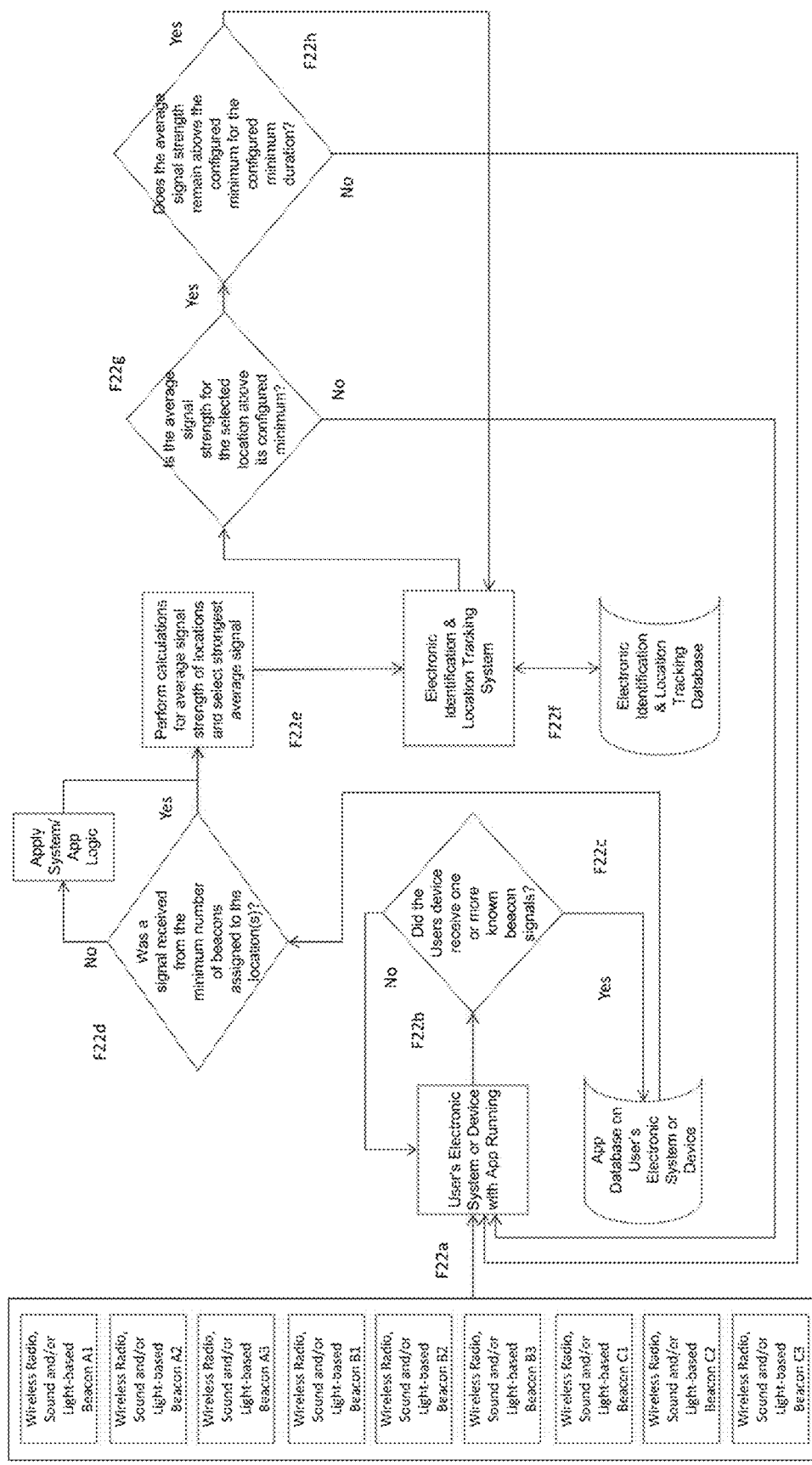
Figure 22: Determination of Presence at Location – Embodiment C

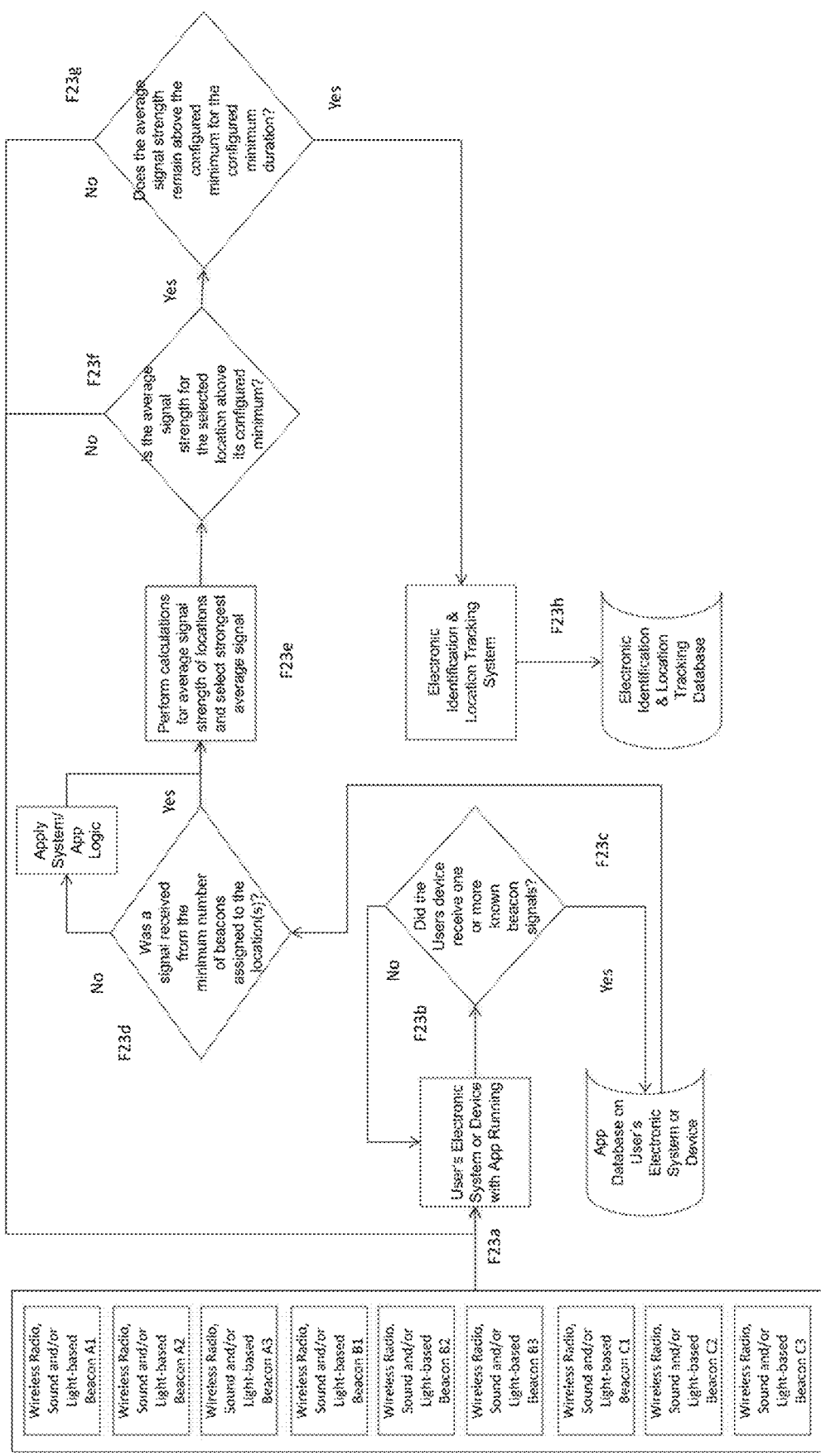
Figure 23: Determination of Presence at Location – Embodiment D

ELECTRONIC ACCESS CONTROL AND LOCATION TRACKING SYSTEM

This application is a continuation of U.S. application Ser. No. 16/173,845, filed Oct. 29, 2018, which is a continuation of U.S. application Ser. No. 15/876,758, filed Jan. 22, 2018, now U.S. Pat. No. 9,997,001, which is a continuation-in-part of U.S. application Ser. No. 15/818,020, filed Nov. 20, 2017, now U.S. Pat. No. 9,858,741, which is a continuation of U.S. application Ser. No. 15/627,820, filed Jun. 20, 2017, now U.S. Pat. No. 9,858,741, which is a continuation of U.S. application Ser. No. 15/286,753, filed Oct. 6, 2016, now U.S. Pat. No. 9,691,206, which is a continuation of U.S. application Ser. No. 15/055,477, filed Feb. 26, 2016, now U.S. Pat. No. 9,466,163, which is a continuation-in-part of U.S. application Ser. No. 14/827,222, filed Aug. 14, 2015, now U.S. Pat. No. 9,424,699, which claims priority to and the benefit of U.S. Application Ser. No. 62/037,684, filed Aug. 15, 2014. All applications are incorporated by reference in their entireties for all purposes.

BACKGROUND

Controlled access areas have become increasingly commonplace in modern society. From hospitals to gated communities, sensitive industries to prison complexes, there is a need to control the flow of human capital. Systems for doing so are often rudimentary, such as those that utilize a guard who checks an individual's identification and access rights. Other systems involve physical keycards and passes, which allow access past static checkpoints.

These systems are often insufficient for controlling and tracking the movement of guests who have access for a particular, limited purpose. Once past a static checkpoint, control systems have limited means for tracking a guest's movements. Furthermore, guests may become lost or enter into areas beyond the scope of their invitation.

Furthermore, determining accurate indoor locations for people and objects has been the goal of numerous government, academia and corporate institutions for well over a decade. GPS, while excellent for outdoors location, isn't well suited for indoor location due to signal attenuation caused by the building materials causing significant power loss for the signals. Numerous technical approaches to accomplishing the goal of accurate indoor location have been researched, developed and tested though the effectiveness and accuracy of each of these methods can vastly differ.

The industry classifies indoor location technologies into infrastructure-based and infrastructure-free technologies. Infrastructure-based technologies require the installation and configuration of physical beacons, typically based on a radio-frequency technology such as IR, WiFi, RFID and Bluetooth but can also include beacons based on sound, magnetic signals or light. Infrastructure-free technologies, typically utilize the existing infrastructure available in a location such as WiFi access points, cellular/GSM signals, geo-magnetic and sound sources though they usually involve quite a bit of configuration in the form of fingerprinting, or the analysis of the specific properties of WiFi, Magnetic, Sound and other signals at various points within the room.

Once the initial infrastructure, fingerprinting, analysis and other implementation steps are done, the various systems currently in existence rely on various forms of signal triangulation, signal measurement, signal disturbance, movement detection, barometric pressure detection, or other forms to detect the location of a person in an indoor space. The technical names for these existing technologies or methods include, but are not limited to, 2.4 Ghz Phase Offset, 2.4 Ghz Time-of-Flight, Ultrasonic Time-of-Flight, IR/Radio Time-of-flight, Modulated Magnetic signals, WiFi+Bluetooth+IMU, WiFi Fingerprinting with Bayesian Filter, WiFi Fingerprinting with Neural Network, WiFi Time-of-Flight with Adaptive filter, WiFi+IMU Fingerprinting and Steerable Antenna Time-of-Flight.

The existing indoor location technologies have performance and accuracy issues related to a variety of factors including but not limited to requiring a line of sight between a persons' device and the beacons/sensors, signal bleed complications, interference from other sources, objects and construction materials, and even the human body acting as a barrier to a signal. Additionally, the overhead in terms of deployment of custom infrastructure, space evaluation, fingerprint analysis, system configuration, equipment costs and other system implementation related issues is relatively high for existing methodologies.

The current disclosure is directed at addressing or reducing the above issues, including, without limitation, with indoor location accuracy, performance and overhead with the additional benefit of user identification and tracking throughout a venue.

SUMMARY OF THE DISCLOSURE

A method and system are described that allows members (as defined below), system administrators or other authorized individuals access into to controlled access locations; as well as the ability for members and administrators to grant temporary and limited access to guests into these locations. Additionally, the method and system allows for navigational services to be provided to members and guests, and real-time tracking and confirmation to members and administrators that guests have arrived at their destination and did not enter any unauthorized areas.

The disclosed method preferably can work through a system of wireless radio, sound and/or light-based beacons communicating with member and guest's smartphones, computer systems, or other electronic devices. Members and administrators can send one or more temporary electronic access keys to a guest's smartphone or other electronic device. Wireless radio, sound and/or light-based beacons provide an access control & location tracking system with real-time data about the member and guest whereabouts, allowing for the confirmation and tracking described above and below. Depending on the type of location using the system, in certain circumstances one or more members, in addition to guests, also may not have access to all restricted areas at the given location. As a non-limiting example, where the system is used by a condominium ("condo") building and a particular condo owner is delinquent on their Condo Association fees, access to community areas (i.e. exercise rooms, club house, etc.) for the particular condo owner could be restricted, but not the entrance, elevators or garage. As another non-limiting example, commercial buildings may allow a tenant to access the building entrance, elevator for their particular floor and garage, but not other floors of the building.

Additionally, a method and system are described that allows for the electronic determination of a person's location in an environment where existing technologies such as GPS are often unable to provide accurate location information. Additionally, the method and system allow for navigational services to be provided to persons, and real-time location determination and location tracking. The disclosed method preferably can work through a system of wireless radio, sound and/or light-based beacons communicating with the customer's smartphone, computer system, or another electronic device of the customer. Wireless radio, sound and/or light-based beacons provide a system with real-time data about the user's whereabouts, allowing for the confirmation and tracking described above and below. Depending on the type of location using the system, in certain circumstances one or more functions of the system may not be needed or available to users and companies alike. As a non-limiting example, where the system is used by a company that provides food and beverage service, a user can place an order for food/beverages and the order delivered to the person at their current location as determined by the system whereas when the system is used by a company which retails consumer products the company may not implement or need this specific feature of the system.

Thus, in certain embodiments, a method and system that allows authorized individuals access into controlled access locations and the ability to grant temporary and limited access to guests into these locations. The method and system allows for navigational services to be provided to members and guests, and real-time tracking and confirmation to members and administrators that guests have arrived at their destination and did not enter any unauthorized areas. The method preferably can work through a system of wireless radio, sound and/or light-based beacons communicating with member and guest's electronic devices. Members and administrators can send one or more temporary electronic access keys to a guest's smartphone or other electronic device. Wireless radio, sound and/or light-based beacons provide an access control and location tracking system with real-time data about the member and guest whereabouts, allowing for the confirmation and tracking.

The following non-limiting definitions are provided as an aid in understanding at least some of the embodiments for the disclosed novel methods and systems:

| | |
|---|---|
| Access Control & Location Tracking Database | The electronic database where permissions and locations of guests and members are managed and stored. |
| Access Control & Location Tracking System | The specially programmed computer/electronic system which monitors guest and member authorizations and locations based on information received from and being in communication with wireless Radio, Sound and/or Light-based Beacons to monitor activity in controlled access areas. |
| Member/Guest Electronic Computer System or Device | A specially programmed computer system or electronic device including, but not limited to, cell phone, smartphone, key card, tablet, laptop or other computer system belonging to a member, guest, administrator or public service personnel. |
| Access Control & Location Tracking Keychain Database | An electronic database that stores digital access keys sent to a specific member, guest, administrator or public service personnel's device. The keychain database can store digital keys from one or more different access control & location tracking systems and is preferably stored on the member/guest's electronic device which stores the particular member's or guest's keys. This allows the system to be used at multiple locations via a single electronic device app. The other above defined database (Access Control & Location Tracking Database) is preferably provided at each location of installation for the system and stores the keys, member/guest information and access rights for the particular installation of the system. |
| Administrator | A person responsible for the determining who is authorized to enter into a controlled access area. |
| Authorized Persons | Persons who have permission to enter a controlled access area. |
| Checkpoint | A pre-determined location within a controlled access area where the Access Control & Location Tracking system is programmed to determine whether a member or guest has the necessary credentials to proceed further. |
| Controlled Access Area Or Controlled Access Location | Locations where the general public may not enter without permission from a member or administrator. (e.g. sensitive areas in hospitals, gated communities, prisons, private areas of businesses, apartment buildings). |
| Device | A smartphone, cellular phone, computer, tablet, laptop or any electronic device with wireless radio, sound and/or Light-based Beacon communication capability and specifically programmed with the App and/or the below defined "Permissions Application". |
| Guest | An individual with temporary, limited access into all or part of a controlled access area. |
| Key | An electronic or digital code, which is stored in the permissions application. This code is checked against the access control & location tracking database to determine whether a member or guest has permission to be in a controlled access area at a given date and time. |
| Member | An individual with permission to be in a controlled access location, and authority to grant guests access to a controlled access location. |
| Permissions Application | A software based application which retains the permissions for entry into controlled access locations. This application can be run on a smartphone, computer, tablet, or other electronic device. |
| Electronic Location Identification & Tracking System Database (database) | An electronic database where locations, permissions and user profiles are managed and stored. |

-continued

| | |
|---|---|
| Electronic Location Identification & Tracking System (system) | A specially programmed electronic or computer system which electronically determines users' locations, presence at locations and departure from locations based on information received from and being in communication with wireless radio, sound and/or light-based beacons. |
| Electronic Location Identification & Tracking System Application (App) | A specially designed software application "App" that is installed on the user's electronic system or device and which allows and directs the user's electronic system or device to communicate with wireless radio, sound and/or light-based beacons in order to identify the user's current location. |
| User | One or more persons who have entered the physical location of an organization who wishes to utilize the location identification and tracking system on their device. |
| System Administrator | One or more persons responsible for entering and maintaining information about each user in the system and database as well as configuring locations and performing beacon management. |
| User's Electronic System or Device | A computer system or electronic device, preferably portable or mobile, including, but not limited to, cell phone, smartphone, key card, tablet, laptop or other computer system belonging to and/or carried/possessed by a user that is specially programmed with the Electronic Location Identification & Tracking System App to permit communication with one or more wireless radio, sound and/or light-based beacons. |
| Wireless Radio, Sound and/or Light-based Beacon | A small receiver/transmitter capable of operating on short and/or long range wireless communication between electronic devices. Capabilities include, but are not limited to, pinpointing its own location, being programmed or designed to utilize, or otherwise utilizing, the software in a smart phone, cellular phone or other electronic device to determine that device's location and bi-directional data transmission. Wireless radio, sound and/or light-based beacons can utilize technologies including, but not limited to, Near Field Communication (NFC), Bluetooth, WiFi, Light-Fidelity (LiFi), Magnetic, Ultrasound, InfraRed (IR), and Radio Frequency (RF). All of these technologies and similar current or similar later developed communication technologies are included in the term "wireless radio" wherever that term appears in this disclosure. |
| Location Cluster | A group of Wireless Radio, Sound and/or Light-based Beacons which as a group are utilized in connection with all members of the group in the determination of a customer's location. The location cluster can consist of one or more beacons, clustered together utilizing the same or different beacon technologies such as NFC, Bluetooth, WiFi, IR, etc. |

BRIEF DESCRIPTION OF THE DRAWINGS

FIG. 1 is a block diagram of certain non-limiting components of the disclosed access control and location tracking system and also illustrating the steps/communications generally involved in the registration of a member device;

FIG. 2 is a block diagram of certain non-limiting components of the access control and location tracking system and also illustrating the steps/communications generally involved in sending an access key to a guest device;

FIG. 3 is a block diagram of certain non-limiting components of the access control and location tracking system and also illustrating the steps/communications generally involved in determining access rights;

FIG. 4 is a block diagram of certain non-limiting components of the access control and location tracking system and also illustrating the steps/communications generally involved in determining authorized locations;

FIG. 5 is a block diagram of certain non-limiting components of the access control and location tracking system and also illustrating the steps/communications generally involved in determining arrival at authorized locations;

FIG. 6 is a block diagram of certain non-limiting components of the access control and location tracking system and also illustrating the steps/communications generally involved in determining location and navigational support;

FIG. 7 is a block diagram and process flow for access control and the notification rules engines for the disclosed access control and location tracking system;

FIG. 8 is block diagram and process flow for the storage of electronic keys in the keychain database in connection with the disclosed access control and location tracking system;

FIG. 9 is a block diagram of certain non-limiting components of the access control and location tracking system and also illustrating the steps/communications generally involved in sending electronic keys from an electronic device to the access control and location tracking system;

FIG. 10 is a block diagram of certain non-limiting components of the access control and location tracking system and also illustrating the steps/communications generally involved in auto-prompting for selecting an electronic key for sending from an electronic device to the access control and location tracking system;

FIG. 11 is a block diagram of certain non-limiting components of the access control and location tracking system and also illustrating the steps/communications generally involved in auto-prompting and electronic key selection for sending from an electronic device to the access control and location tracking system;

FIG. 12 is a block diagram of certain non-limiting components of the access control and location tracking system and also illustrating the steps/communications generally involved in a guest requesting an electronic key from a member in connection with the access control and location tracking system;

FIG. 15 is a process flow and block diagram illustrating the registration of a customer/user's device in accordance with one embodiment for the disclosed system and method;

FIG. 16 is a process flow and block diagram illustrating the registration of a beacon or cluster of beacons location in accordance with one embodiment for the disclosed system and method;

FIG. 17 is a process flow and block diagram illustrating a first embodiment for determining a customer's presence at location by the disclosed system and method;

FIG. 18 is a process flow and block diagram illustrating another embodiment for determining a customer's presence at location by the disclosed system and method;

FIG. 19 is a process flow and block diagram of a location rules engine in accordance with one embodiment for the disclosed system and method;

FIG. 20 is a process flow and block diagram illustrating a user/customer opt-out of tracking/monitoring by a company/facility in accordance with one embodiment for the disclosed system and method;

FIG. 21 illustrates a non-limiting sample of a customer presence determination using beacon clustering at a location in accordance with one embodiment for the disclosed system and method;

FIG. 22 is a process flow and block diagram illustrating a further embodiment for determining a customer's presence at location by the disclosed system and method; and FIG. 23 is a process flow and block diagram illustrating an additional embodiment for determining a customer's presence at location by the disclosed system and method.

DETAILED DESCRIPTION

Figure 13:
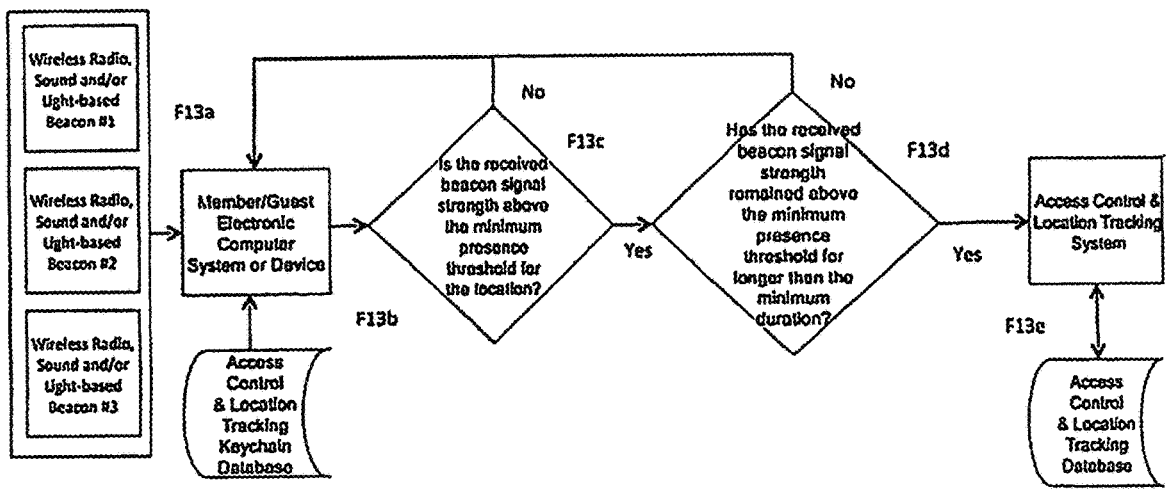
FIG. 13 is a block diagram of certain non-limiting components for determining presence at a specific location and also illustrating the steps/communications generally involved in selecting the appropriate digital key for the specific location.

FIG. 1 shows one method for allowing a member to register their computer system or electronic device with the disclosed access control & location tracking system. This initial registration process preferably allows a member to electronically receive digital/electronic access keys as well as grant a guest access to a controlled access location, and subsequently track the guest's location within that area.

At step F1a, a member registers their electronic computer system or electronic device with the disclosed access control & location tracking system. This enables the member to use their computer system or electronic device to access restricted locations and provide their guests with temporary access to controlled access areas. It also allows the member to use their electronic device to track their guest's location within the controlled access area, and confirm their guest's arrival and departure at a given permitted location. Registration can be accomplished in a number of non-limiting ways. As one non-limiting example, the system administrator can register the members directly through the programmed software using a form and then have the members credentials sent to the member via SMS, MMS, Email, Voice, Mail or other delivery methods. Alternatively, the member can download the software application (app) to their electronic device, register through a form on the app and then the system administrator can approve or deny the registration request. Once the software app is installed on the electronic device and registration is accepted by the system administrator the members digital/electronic keys can be downloaded by the member to the electronic device and stored in their electronic keychain database on their electronic device. The application/database storing the digital/electronic keys then transmits the key to the Access Control & Location Tracking System via any of the wireless radio, light or sound based technologies (wifi, Bluetooth, lifi, rfid, etc.)

At step F1b, the access control & location tracking system is programmed to record permissions afforded to and requested by members and retains and electronically stores those permissions in the Access Control and Tracking Location database. The system utilizes this database's record of members, guests, access rights, locations, and permissions to determine and then grant the level of access to a member, a guest requested by a member, and to provide the real time tracking and confirmation of member and guest movements.

At step F1c, the access control system administrator oversees the access control & location tracking system. Through the system, the administrator can track all member and guest movements, rights, and access. This allows the administrator to employ the necessary level of security or emergency response to protect the safety of members and guests, should a member or guest go beyond the scope of their access. The administrator is notified of the device registration request and can grant or revoke permission to use the registered device. Though not limiting, in the preferred embodiment, the system can be programmed such that the administrator receives device registration requests from a member. The system can also be programmed such that guest registration requests go directly to the member they are requesting access from (though the system can also be programmed to permit the administrator to override, approve and/or cancel decisions made by the member concerning the guest's request).

At step F1d, the access control & location tracking system electronically sends the member's electronic computer system or electronic device the digital access key assigned to them. It also provides the member's electronic computer system or electronic device with real time information on their guest's or other associated/authorized member's whereabouts. This allows the member to confirm that the guest reached their destination.

At step F1e, the digital access key is stored in the electronic keychain database on the member's electronic computer system/device. A similar keychain database on a guest's electronic device is created to store any digital access key(s) granted to a guest through the system.

FIG. 2 illustrates how a member provides a guest access to the controlled access location. The member electronically sends the guest a digital electronic key, which provides the guest with access to a controlled access area limited by the parameters set by the member.

At step F2a, a member electronically sends a request to the access control computer system that a digital key be generated and electronically sent to a guest. The member enters any limitations to be placed on the guest's access to the controlled area in the request. An administrator can also be permitted to enter additional access restrictions for the guest. In one non-limiting embodiment, the system can be programmed to provide a form containing a series of checkboxes for each location controlled by the system that the member can select from. A date and time module can also be provided for allowing the member to indicate the starting date and time and ending date and time for the guest's digital key. Further detail on the permissions and limitations a member can place on a key for a guest is discussed in connection with FIG. 7.

At step F2b, the access control and location computer system records the member's request and automatically enters it into the access control database. This information is electronically stored and later used by the Access Control & Location Tracking system when the guest receives their access key and enters the secured access location.

At step F2c, the access control and location computer system can directly send the guest an electronic key to their smartphone or other electronic device via electronic communication methods including but not limited to direct data connection, SMS, Email, MMS and voice. A confirmation electronic message can be sent to the member to inform them that their guest's key was approved and sent to the guest. Alternatively, the system can be programmed that the guest key is first sent to the member, and the member forwards it to the guest. The key is imported to a software application, which is stored locally on the guest's device. This application acts as an electronic keychain of access keys. In one non-limiting embodiment, the digital key can be an electronic file, which is preferably encrypted. The key can be auto-imported where it is sent to person's electronic device through an app directly that is downloaded on the electronic device or manually added if the key is sent through SMS or email. For the manual method, the guest can click on the file and than have an app import the key to the local device database. Once the guest receives the key, the guest has all access rights, which have been granted to them by a member, as seen/discussed in step F2a and FIG. 7. The guest can have a key provided by multiple members within the same Access Control & Location Tracking System location or keys for multiple locations (with separate instances of the Access Control & Location Tracking System). As a non-limiting example, if the guest is a service provider (i.e. plumber, electrician, personal trainer, delivery person, etc.) the guest may need to have keys from multiple members at any given time. Also in some instances a person can be a member at one location and a guest at other locations and may have member key(s) and guest(s) keys on his or her electronic keychain database stored on his or her electronic device.

At step F2d, the electronic key is electronically stored in the access control & location tracking keychain database on the guest's device.

FIG. 3 illustrates how the system grants or denies access to a member or guest based on the electronic key on their device.

At step F3a, the member or guest attempting to enter a controlled access location will have an electronic key on their device, such as the electronic key the guest receives from the steps described in FIG. 2. Through a wireless radio, sound and/or light enabled application, their device will retrieve all electronic keys stored in the device's keychain database and transmit them to any wireless radio, sound and/or light-based beacons in an immediate proximity to the controlled access area entrance. FIG. 9 shows one non-limiting embodiment where the electronic device can be configured for its owner to manually select the digital key to transmit (i.e. virtual clicker), while FIG. 10 shows another non-limiting embodiment where the electronic device can be configured to auto-sense that it is at a beacon and then have the user manually select the digital key to transmit to the beacon and FIG. 11 shows a further non-limiting embodiment where the electronic device can be configured to automatically sense that it is at a beacon and then automatically send the digital key(s) to the beacon. The member or guest can also choose which specific key to transmit if so configured and desired. The key can be manually chosen via a user interface provided by the software installed on the member's or guest's electronic device or it can also just send all keys available on the users keychain to the system and it will continue to check each key on the keychain to see if one grants them access for the location, date and time. The system can be programmed such that access denial is only given after all available keys are checked. Preferably, the built in capabilities of conventional smartphones/electronic devices can be used, as they currently come with Wifi, Bluetooth and sometimes NFC radios or InfraRed sensors, and some also have ultrasonic capable microphones or lifi built in. If not provided, these technologies can be provided or later acquired by the electronic device. The Access Control and Location Tracking system, through instructions provided by the programmed software, accesses the radios and other communication hardware available on the electronic device and uses them as needed.

At step F3b, the member or guest's device will communicate through wireless radio, sound and/or light-based beacons with the access control and location tracking system. The system will then recognize that a device with the application is in proximity to a controlled access area and retrieve the key(s) stored on said device. As mentioned above, the software can be configured to automatically send the keys or the member/guest can choose which key to send. When the software on the member/guest's electronic device is in range of a beacon, it can receive a signal triggering it to send the keys in its keychain database to the access control & location tracking database.

At step F3c, the access control & location tracking system automatically searches though the access control & location tracking database for permissions granted to the member or guest from the provided key. The member or guest will be permitted to enter areas based on these permissions.

At step F3d, when a member or guest wishes to enter into a controlled access area, the system will determine whether the member or guest has a valid key allowing entry. If a valid key is presented, access is granted and an electronic signal is sent to open the access barrier such as a Gate, Door, Elevator or other Entryway. Additionally, notification is electronically sent to Security Staff through a computer screen or other electronic device. The access control & location tracking database is updated with details pertaining to the access event such as the key code, date, time and location.

At step F3e, if a valid key is not presented, then access will be denied and notification is sent to Security Staff through a computer screen or other electronic device. The access control & location tracking database is updated with details pertaining to attempted access event including the key code, date, time and location. Optionally, the Access Control and Location Tracking system can be programmed that where a guest or member attempts to enter an area where they are not approved (i.e. when access denied by the system), all of some of the access permissions that they have been granted are suspended or terminated, to permit the administrator or other proper personnel (i.e. security) to investigate the denial (i.e. determine whether it was an accident or that the member/guest has bad motives). The results of the investigation can determine whether the previous permissions are granted again or unsuspended by the system.

FIG. 4 demonstrates how the system determines whether a member or guest is in an authorized or unauthorized location on a continuous basis.

At step F4a, physical wireless radio, sound and/or light-based beacons are placed throughout a controlled access area. These are arranged so that when a member or guest with a wireless radio, sound and/or light enabled device and the permissions application running enters the area, they are preferably constantly within range of a beacon. The member or guests access key can be automatically electronically retrieved from the keychain database stored in their electronic device and transmitted by the wireless radio, sound and/or light-based beacons to the access control & location tracking system preferably in continuous intervals.

At step F4b, the access control & location tracking system receives the access key(s) and compares the key(s) to the access control & location tracking database to determine the permissions afforded to each specific key that is received.

At step F4c, if the member or guest is in an authorized location based on the permissions retrieved in F4b, then the system will update the database to reflect the current location of the member or guest.

At step F4d. If the member or guest is in an unauthorized location, then the system administrator and/or security staff is notified. In the case of a guest, the member who granted the guest access can be notified as well that the guest has gone beyond the parameters of their authorization. The alert is generated by the access control & location tracking system and can be sent through computer, voice, email, IM, SMS, MMS, pager or other communication method. The access control & location tracking database can also be updated with the member or guests current location. Additionally, the termination or suspension of all or some of the guest/member's access permissions as described above can also be performed by the Access Control & Location Tracking system.

FIG. 5 demonstrates how the system determines whether a member or guest has arrived at their authorized location after being granted access into the controlled access area as described in FIG. 3.

At step F5a, physical wireless radio, sound and/or light-based beacons are placed throughout a controlled access area to determine specific locations within the access area. These are arranged so that when a member or guest with a wireless radio, sound and/or light enabled device and the permissions application running enters the area, they are preferably constantly within range of a beacon. The member or guests access key can be automatically electronically retrieved from the keychain database stored in their electronic device and transmitted by the wireless radio, sound and/or light-based beacons to the access control & location tracking system preferably in continuous intervals.

At step F5b, the access control & location tracking system receives the access key(s) as well as location of the device based on which wireless radio, sound and/or light-based beacons received the key and compares the key(s)/location to the access control & location tracking database.

At step F5c, if the access control & location tracking system determines that the location of the member or guest is at the final authorized location based on the permissions retrieved in F5b, then the system will update the database.

At step F5d, if the access control & location tracking system determines that the location of the member or guest is not at the final authorized location within the time allotted based on the permissions retrieved in F5b, then the system administrator and/or security staff is notified. In the case of a guest, the member who granted the guest access can be notified as well that the guest has not arrived at their authorized location within the time period allotted. The alert is generated by the access control & location tracking system and can be sent through computer, voice, email, IM, SMS, MMS, pager or other communication method. The access control & location tracking database is also updated with the member or guests current location.

FIG. 6 demonstrates how the system provides navigational assistance to members and/or guests after being granted access into the controlled access area as described in FIG. 3.

At step F6a, physical wireless radio, sound and/or light-based beacons are placed throughout a controlled access area to determine specific locations within the access area. These are arranged so that when a member or guest with a wireless radio, sound and/or light enabled device and the permissions application running enters the area, they are preferably constantly within range of a beacon. The member or guests access key can be automatically electronically retrieved from the keychain database stored in their electronic device and then transmitted by the wireless radio, sound and/or light-based beacons to the access control & location tracking system in preferably continuous intervals.

At step F6b, the access control & location tracking system receives the access key(s) as well as location of the device based on which wireless radio, sound and/or light-based beacons received the key and compares the key(s)/location to the access control & location tracking database.

At step F6c, if the access control & location tracking system determines that the location of the member or guest is at the final authorized location based on the permissions retrieved in F6b, then the system will update the database.

At step F6d, if the access control & location tracking system determines that the location of the member or guest is not at the final authorized location based on the permissions retrieved in F5b, then it updates the access control & location tracking database with the member or guests current location. The system then calculates the possible routes to the final authorized location from the current location of the member or guest. The route information is electronically sent to the member or guests device through computer, voice, email, IM, SMS, MMS, pager or other communication method. Visual interpretation and presentation of the route may also be provided, such as, but not limited to through the electronic device's screen or display. Additionally, the termination or suspension of all or some of the guest/member's access permissions as described above can also be performed by the Access Control & Location Tracking system where the guest/member does not reach a specific location in the allotted or predetermined amount of time.

FIG. 7 demonstrates how a member or system administrator can create a new digital key and assign the specific permissions and notifications for the new digital key. This process can also be utilized to edit permissions and notifications for existing keys.

At step F7a, the "Create New Key" function is selected within the access control & location tracking system by a user with key creation privileges such as a system administrator or member. Preferably, the system administrator or member will have previously signed on or logged in to the system so that their key creation privileges are recognized by the system. Guests are preferably not allowed to create new keys, though such is not considered limiting, and the system can be programmed where a guest could create a key or transfer his or her key to another keychain in certain or limited situations (i.e. husband to wife or vice versa, etc.).

At step F7b, the access control & location tracking system electronically queries the system database to determine existing key recipients as well as available locations, access points, and the rule set assigned to the system administrator or member creating the new key. The user can only create new keys that they themselves have been granted permissions for. As a non-limiting example, if a given user is not allowed access to a specific location, said user would not be able to create a key granting access to that specific location. The screens and options available for creating a key in F7c through F7l are customized based on the granted permissions for the user creating the key. Therefore, another user who has more permissions than the user presented with the options in F7c through F7l could be presented with additional options and screens not shown in F7c through F7l. Similarly, another user who has less permissions may be presented with less than all of the options and screens shown in F7c through F7l. Additionally, the system can be programmed such that the options specified in F7c through F7l work in conjunction with each other, so for example, if a single date is specified along with a specific time span, the key can only be valid for that time span on the specified date.

At step F7c, the user enters or selects the recipient's name and contact information from the list of available recipients retrieved in F7b. The specific data elements entered will depend on the electronic method desired to send the digital key to the recipient. For example if email delivery is selected, then a name and email address is required for the recipient but if an SMS or voice call is selected, a name and phone number for the recipient is required.

At step F7d, the user selects the type of key recipient for this new key. Keys can be created for Members, Guests, Administrators and/or Public Service personnel such as Police, Fire, Utility and Government Agency workers, though such is not considered limiting, and other types of individuals based on status, employment, etc. can also be digital key recipients.

At step F7e, the user specifies the number of times this digital key can be used. Keys can be created for one-time use only, for a specific number of times or for an unlimited number of times.

At step F7f, the user specifies the permissible access dates for the digital key. Keys can be created for a single time span, multiple time spans, or without a time restriction.

At step F7g, the user specifies the permissible access times of day/night for the digital key. Keys can be created for a single time span, multiple time spans, or without a time restriction.

At step F7h, the user specifies the permissible access locations and entry points for the digital key. Keys can be created for a single location/entry point, multiple locations/entry points, or all locations and entry points.

At step F7i, next the user can select if notifications are to be sent related to the usage of this digital key. This function would typically apply to keys generated for guests or public service personnel. If the user does not wish to configure any notifications related to the use of this key, the data and entries for the specific digital key created are saved in the electronic database and steps F7j through F7m are skipped. If they user wishes to create notifications related to the use of this key, then the user can preferably proceed to F7j.

At step F7j, the user selects the type(s) of notifications to be sent. As non-limiting examples, notifications can be sent based on the usage of the key to gain entry to a restricted location, upon arrival at a permitted location, when the key recipient does not arrive at a specific location or if the key recipient has navigated off course from the point of entry to the final authorized location.

At step F7k, the user selects the method(s) of notifications to be sent. Notifications can be sent via SMS/MMS, Email, Voice, or on-screen at the access control & location tracking system or directly through the access control & location tracking system software on the administrator or member's electronic computer system/device.

At step F7l, the user selects or enters the notification recipient(s). Notification recipient(s) can be selected from a list of existing administrators and members or entered with the recipient(s) name and contact information. For example if an email notification is selected, then a name and email address is preferably provided for the recipient but if an SMS or voice call is selected, a name and phone number for the recipient is preferably provided.

At step F7m, the digital key with all permission and notification settings is electronically saved in the system database.

At step F7n, the access control & location tracking system electronically delivers the newly created (or modified) key to the recipient according to the contact information obtained in F7c.

FIG. 8 demonstrates how a member, guest, system administrator or public service personnel can receive digital keys from multiple access control & location tracking systems and store those keys in an electronic keychain database on their electronic computer system or device. The multiple systems can be associated with multiple locations. In one non-limiting example, one location can be residential community 1, the next location condo building 2, the next location a commercial office building. In some instances, the beacons can be used in multiple systems (i.e. lobby of a commercial office building where multiple systems are installed in the building for different companies that have office space in the building, etc.)

At step F8a, one or more access control & location tracking systems generates digital key(s) for a member, guest, administrator or public service personnel as described above. The digital keys are electronically sent to a computer system or device belonging to the member, guest, administrator or public service personnel.

At step F8b, the digital keys sent to the member/guest's electronic computer system or device are electronically stored in the keychain database also stored on the device.

The system can operate similar for members as it does for guests, with the exception that a member can be permitted to create and provide electronic guest keys to others, granting no more than the member's own level of privileges and/or access. Guest can preferably only use the electronic key provided by a member or another authorized user of the system, but preferably cannot create electronic guest keys for other guests or permit another electronic device to use the electronic guest key they were provided with (i.e. cannot forward the electronic guest key to another guest). However, the system can also be programmed to permit a guest to transfer their electronic guest key to another authorized guest already listed in the system (i.e. husband to wife or vice versa, parent to child, etc.), such as where only one guest key is created.

FIG. 9 illustrates how a member or guest would manually choose a key from their device's keychain database to transmit to an access control & location tracking system.

At step F9a, the member or guest attempting to enter a controlled access location will have an electronic key(s) on their device, such as the electronic key(s) the guest receives from the steps described in FIG. 2. The electronic key(s) will be stored in the keychain database on the member's/guest's electronic device. The member or guest opens the Access Control & Location Tracking system application on their electronic device and selects the option to manually transmit a key. The application on the device queries the keychain database on said device to determine which keys are stored and available for transmission.

At step F9b, if no access key has been selected for transmission, the application on the member or guests electronic device will continue to wait for authorization to transmit a selected key.

At step F9c, f the member or guest selects a key and authorizes its transmission, the device will retrieve the selected electronic keys stored in the device's keychain database and transmit it to any wireless radio, sound and/or light-based beacons in an immediate proximity to the controlled access area entrance. Preferably, the built in capabilities of conventional smartphones/electronic devices can be used, as they currently come with Wifi, Bluetooth and sometimes NFC radios or InfraRed sensors, and some also have ultrasonic capable microphones or life built in. If not provided, these technologies can be provided to, downloaded or later acquired by the electronic device. The Access Control and Location Tracking system, through instructions provided by the programmed software, accesses the radios and other communication hardware available on the electronic device and uses them as needed. The software can use any communication hardware (i.e. WiFi radios, Bluetooth radios, NFC radios, LiFi, IR, etc.) that is installed on the electronic device and can use the various hardware as needed to perform the functions of the software.

At step F9d, the member or guest's transmitted key is received through wireless radio, sound and/or light-based beacons and sent to the access control and location tracking system.

At step F9e, the access control & location tracking system automatically searches though the access control & location tracking database for permissions granted to the member or guest from the provided key. The member or guest will be permitted to enter areas based on these permissions.

At step F9f, if a valid key is presented, an electronic notification can be sent back to the member or guest's electronic device through the wireless radio, sound and/or light-based beacon indicating the key was validated and used.

At step F9g, the application on the member or guest's electronic device updates the access control & location tracking keychain database indicating the usage of the key.

At step F9h, if a valid key is not presented, an electronic notification can be sent back to the member or guests' electronic device through the wireless radio, sound and/or light-based beacon indicating the key was not validated and asking the member or guest to select a new key to transmit.

At step F9i, the application on the member or guests' electronic device queries the access control & location tracking system keychain database for any other available keys and the process begins again at F9(b). If no other keys are available, the member or guest can then take steps to request a key as described in FIG. 1 or 12.

FIG. 10 illustrates how a member or guest would manually choose a key from their device's keychain database to transmit to an access control & location tracking system after prompting by a wireless radio, sound and/or light based beacon.

At step F10a, wireless radio, sound and/or light based beacon(s) transmit a signal that is received by the member or guests electronic device. The application installed and running on the member or guests' electronic device will receive the signal from the beacon(s) and prompt, preferably automatically, the member or guest that they are in the proximity of the beacon(s) and to select a key for transmission to the beacon(s).

At step F10b, the member or guest attempting to enter a controlled access location will have an electronic key(s) on their device, such as the electronic key(s) the guest receives from the steps described in FIG. 2. The electronic key(s) will be stored in the keychain database on the device. The member or guest opens the Access Control & Location Tracking system application on their electronic device and selects the option to manually transmit a key. The application on the device queries the keychain database on the device to determine which keys are stored and available for transmission.

At step F10c, if no access key has been selected for transmission, the application on the member or guest's electronic device will continue to wait for authorization to transmit a selected key.

At step F10d, if the member or guest selects a key and authorizes its transmission, the device will retrieve the selected electronic keys stored in the device's keychain database and transmit it to any wireless radio, sound and/or light-based beacons in an immediate proximity to the controlled access area entrance. Preferably, the built-in capabilities of conventional smartphones/electronic devices can be used, as they currently come with Wifi, Bluetooth and sometimes NFC radios or InfraRed sensors, and some also have ultrasonic capable microphones or lifi built in. If not provided, these technologies can be provided or later acquired by the electronic device. The Access Control and Location Tracking system, through instructions provided by the programmed software that can be similar to those instructions referenced for FIG. 9, accesses the radios and other communication hardware available on the electronic device and uses them as needed. The software can use any communication hardware (i.e. WiFi radios, Bluetooth radios, NFC radios, LiFi, IR, etc.) that is installed on the electronic device and can use the various hardware as needed to perform the functions of the software.

At step F10e, the member or guest's transmitted key is received through wireless radio, sound and/or light-based beacons and sent to the access control and location tracking system.

At step F10f, the access control & location tracking system automatically searches though the access control & location tracking database for permissions granted to the member or guest from the provided key. The member or guest will be permitted to enter areas based on these permissions.

At step F10g, if a valid key is presented, an electronic notification can be sent back to the member or guest's electronic device through the wireless radio, sound and/or light-based beacon indicating the key was validated and used.

At step F10h, the application on the member or guest's electronic device updates the access control & location tracking keychain database indicating the usage of the key.

At step F10i, if a valid key is not presented, an electronic notification can be sent back to the member or guests' electronic device through the wireless radio, sound and/or light-based beacon indicating the key was not validated and asking the member or guest to select a new key.

At step F10j, the application on the member or guests' electronic device queries the access control & location tracking system keychain database for any other available keys as in F10(b) and the process repeats from that point. If no other keys are available, the member or guest can then take steps to request a key as described in FIG. 1 or 12.

FIG. 11 illustrates how a key from a member or guests' electronic device keychain database is automatically transmitted to an access control & location tracking system after prompting by a wireless radio, sound and/or light based beacon.

At step F11a, wireless radio, sound and/or light based beacon(s) transmit a signal that is received by the member or guests electronic device. The application installed and running on the member or guests' electronic device will receive the signal from the beacon(s) and begin to search for a key to transmit. Each beacon in the system can send out a signal that the application on the electronic device can read. That signal can contain information such as, but not limited to, the name of the beacon, the organization it belongs to and location of the beacon. This same location information can be stored in the keys that are generated.

At step F11b, the member or guest attempting to enter a controlled access location will have an electronic key(s) on their device, such as the electronic key(s) the guest receives from the steps described in FIG. 2. The electronic key(s) will be stored in the keychain database on the device. The member or guest opens or has running, the Access Control & Location Tracking system application on their electronic device and said application is or has previously been configured to automatically transmit a key(s). The application on the device queries the keychain database on said device to determine which keys are stored and available for transmission.

At step F11c, if no access key exists in the database for this location, the member or guest is notified through the access control & location tracking application installed and running on their electronic device. The member or guest can then take steps to request a key as described in FIG. 1 or 12.

At step F11d, if the access control & location tracking system application on the member or guests' electronic device locates a key for the location, it will retrieve the selected electronic key stored in the device's keychain database and transmit it to any wireless radio, sound and/or light-based beacons in an immediate proximity to the controlled access area entrance. In one embodiment for locating the key, the software can compare the location and other information it received from the beacon to search the keychain database. Preferably, the built in capabilities of conventional smartphones/electronic devices can be used, as they currently come with Wifi, Bluetooth and sometimes NFC radios or InfraRed sensors, and some also have ultrasonic capable microphones or lifi built in. If not provided, these technologies can be provided or later acquired by the electronic device. The Access Control and Location Tracking system, through instructions provided by the programmed software that can be similar to the those instructions referenced for FIG. 9, accesses the radios and other communication hardware available on the electronic device and uses them as needed. The software can use any communication hardware (i.e. WiFi radios, Bluetooth radios, NFC radios, LiFi, IR, etc.) that is installed on the electronic device and can use the various hardware as needed to perform the functions of the software.

At step F11e, the member or guest's transmitted key is received through wireless radio, sound and/or light-based beacons and sent to the access control and location tracking system.

At step F11f, the access control & location tracking system automatically searches though the access control & location tracking database for permissions granted to the member or guest from the provided key. The member or guest will be permitted to enter areas based on these permissions.

At step F11g, if a valid key is presented, an electronic notification can be sent back to the member or guest's electronic device through the wireless radio, sound and/or light-based beacon indicating the key was validated and used.

At step F11h, the application on the member or guest's electronic device updates the access control & location tracking keychain database indicating the usage of the key.

At step F11i, if a valid key is not presented, an electronic notification can be sent back to the member or guests' electronic device through the wireless radio, sound and/or light-based beacon indicating the key was not validated and prompting the access control & location tracking system application to select a new key to transmit.

At step F11j, the application on the member or guests' electronic device queries the access control & location tracking system keychain database for any other available keys as in F11(b) and the process repeats from that point.

FIG. 12 shows one method for allowing a guest to request a key from a member.

At step F12a, a guest opens the access control & location tracking system application on their electronic device. Preferably the software app is previously downloaded electronic device and can be used at various different locations where the system is installed. Furthermore, if the person has used the app in the past for access, the app will already be on their electronic device for subsequent uses whether at the previous location or other locations where the system is installed. Through the application, the guest selects or enters the member information for which the guest would like to request a key from. The guest then selects a button to request a key and a key request is transmitted to the access control & location tracking system through any available form of electronic communication and data transfer including but not limited to through a wireless radio, sound or light enabled beacon, wired or wireless internet connection, voice call, SMS, Email or MMS. Furthermore, other non-limiting examples of ways a guest can request a key from a member include, but are not limited to, through a member name directory similar to a call box a community allows a person to scroll through the names of the residents and a method to contact them. The members' address, phone numbers, email addresses and other information does not need to be shown to the guests in order for the guests to use the system to facilitate communication. The system can also be configured so that the directory can be turned off if desired, or the directed limited to those who are at the same location as the guest. Also, the software can be provided with an address book functionality to store member and guests names for future use, which can be useful for a member who needs to frequently issues keys to the same person or a guest who frequently requests access from specific people.

At step F12b, the access control and location computer system records the guest's request and automatically enters it into the access control & location tracking system database. The Access Control & Location Tracking system also retrieves the member's information so that it may forward the request to the member's electronic device.

At step F12c, the Access Control & Location Tracking system transmits the guest key request to the member's electronic device through any available form of electronic communication and data transfer including but not limited to through a wireless radio, sound or light enabled beacon, wired or wireless internet connection, voice call, SMS, Email or MMS.

At step F12d, a member receives the guest key request and proceeds to enter any limitations to be placed on guest's access to the controlled area in the request. An administrator can also be permitted to enter additional access restrictions for the guest. In one non-limiting embodiment, the system can be programmed to provide a form containing a series of checkboxes for each location controlled by the system that the member can select from. A date and time module can also be provided for allowing the member to indicate the starting date and time and ending date and time for the guest's digital key. Further detail on the permissions and limitations a member can place on a key for a guest is discussed in FIG. 7.

At step F12e, the member transmits the newly created guest key from their electronic device to the Access Control & Location Tracking system through any available form of electronic communication and data transfer including but not limited to through a wireless radio, sound or light enabled beacon, wired or wireless internet connection, voice call, SMS, Email or At step F12f, the Access Control & Location Tracking system receives the guest key and stores it in the Access Control & Location Tracking System Database.

At step F12g, the access control and location computer system can directly send the guest an electronic key to their smartphone or other electronic device via electronic communication methods including but not limited to direct data connection, SMS, Email, MMS and voice. A confirmation electronic message can be sent to the member to inform them that their guest's key was approved and sent to the guest. Alternatively, the system can be programmed that the guest key is first sent to the member, and the member forwards it to the guest. The key is imported to a software application, which can be the same software application referenced in Step 12(a), which is stored locally on the guest's device. This application acts as an electronic keychain of access keys. Once the guest receives the key, the guest has all access rights, which have been granted to them by a member, as seen in F2a, F12d and FIG. 7. The guest can have a key provided by multiple members within the same Access Control & Location Tracking System location or keys for multiple locations (with separate instances of the Access Control & Location Tracking System). As a non-limiting example, if the guest is a service provider (i.e. plumber, electrician, personal trainer, delivery person, etc.) the guest may need to have keys from multiple members at any given time. Also in some instances a person can be a member at one location and a guest at other locations and may have member key(s) and guest(s) keys on his or her electronic keychain database stored on his or her electronic device.

At step F12h, the electronic key is electronically stored in the access control & location tracking keychain database on the guest's device.

FIG. 13 demonstrates how the system determines presence at a location to determine the proper digital key to utilize at a specific location and time.

At step F13a, physical wireless radio, sound and/or light-based beacons are placed throughout a controlled access area to determine specific locations within the access area. These are arranged so that when a member or guest with a wireless radio, sound and/or light enabled device and the permissions application running on their device enters the area, they are preferably constantly within range of a beacon.

At step F13b, the member or guests wireless radio, sound and/or light enabled device queries the keychain database stored in their electronic device to determine what location the device is currently located at. This query is done based on the identification information received by the device from the beacon. Preferably, the beacon, at a minimum, transmits a unique identifier to the device. This allows for the beacon's specific location to be determined or known by the device such that the device determines the proper digital key to retrieve from the keychain database for the specific location. Preferably, the device will also learn or determine what the power and duration configuration settings are for the specific location from the signal transmitted by the beacon for the location and/or from information stored in the keychain database associated with the specific location.

At step F13c, the member or guests wireless radio, sound and/or light enabled device determines what the signal strength is from the received signal transmitted by the wireless radio, sound and/or light-based beacon(s). If the received signal strength, which can be measured in Decibels, Signal Strength Percentage or other non-limiting value, is not above the minimum specified or preprogrammed/pre-configured threshold for a given location as determined in F13b, the member or guests wireless radio, sound and/or light enabled device will continue to scan for signals or transmissions from the wireless radio, sound and/or light-based beacon(s) and will make similar signal strength determinations for subsequent signals/transmissions it receives. If the received signal strength is above the minimum threshold for a given location, the system continues to the next step.

At step F13d, the member or guests wireless radio, sound and/or light enabled device begins a timer to determine the length of time that a wireless radio, sound and/or light-based beacon's signal is received above the minimum signal strength threshold. If the received signal strength falls below the minimum threshold before the minimum duration has elapsed, the member or guests wireless radio, sound and/or light enabled device will continue to scan for signals or transmissions from the wireless radio, sound and/or light-based beacon(s) and will make similar signal strength and/or duration determinations for subsequent signals/transmissions it receives. If the received signal strength remains above the minimum threshold as determined in F13b, for longer than the minimum duration then the member or guests wireless radio, sound and/or light enabled device will transmit the key retrieved n F13b to the access control & location tracking system.

At step F13e, the access control & location tracking system will update the access control & location tracking database regarding valid and/or invalid signal determinations from steps 13c and/or 13d. It can then grant or deny access based upon the configured permissions for the particular member or guest.

Figure 14:
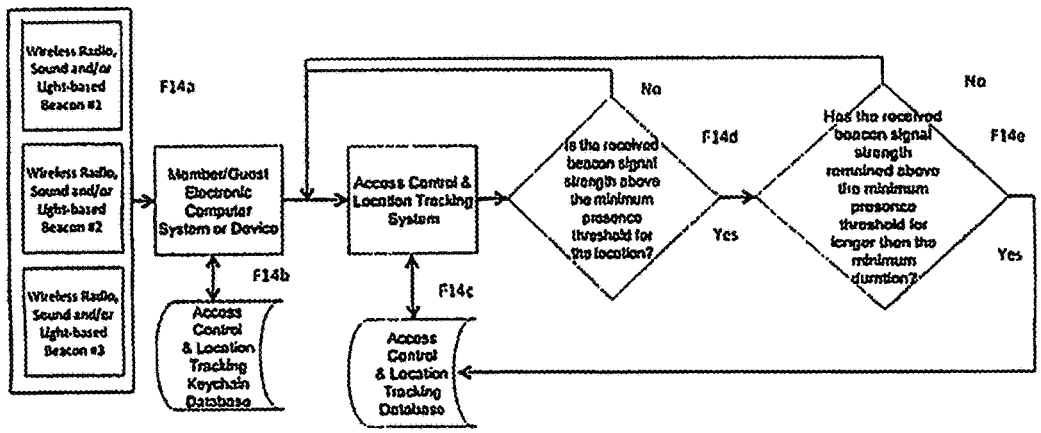
FIG. 14 is a block diagram of certain non-limiting components for determining presence at a specific location and also illustrating another embodiment of the steps/communications generally involved in selecting the appropriate digital key for the specific location.

FIG. 14 demonstrates another method for how the system determines presence at a location to determine the proper digital key to utilize at a specific location and time.

At step F14a, physical wireless radio, sound and/or light-based beacons are placed throughout a controlled access area to determine specific locations within the access area. These are arranged so that when a member or guest with a wireless radio, sound and/or light enabled device and the permissions application running on their device enters the area, they are preferably constantly within range of a beacon.

At step F14b, the member or guests wireless radio, sound and/or light enabled device queries the keychain database stored in their electronic device to determine what location the device is currently located at. This query is done based on the identification information received by the device from the beacon. Preferably, the beacon, at a minimum, transmits a unique identifier to the device. This allows for the beacon's specific location to be determined or known by the device such that the device determines the proper digital key to retrieve from the keychain database for the specific location. Preferably, the device will also learn or determine date and time information.

At step F14c, the member or guests wireless radio, sound and/or light enabled device transmits its identification, location and what the signal strength is from the signal/transmission it received from the wireless radio, sound and/or light-based beacon(s) to the Access Control & Location Tracking System.

At step F14d, The Access Control & Location Tracking System determines what the power and duration configuration settings are for the specific location.

At step F14e, the Access Control & Location Tracking System compares the configured settings retrieved in F14d to the received signal strength being reported by the member or guests wireless radio, sound and/or light enabled device. If the received signal strength, which can be measured in Decibels, Signal Strength Percentage or other non-limiting value, is not above the minimum specified threshold for a given location as determined above, the Access Control & Location Tracking System will continue to scan for signals or transmissions from the member or guests wireless radio, sound and/or light enabled device and will make similar signal strength determinations for subsequent signals/transmissions it receives. If the received signal strength is above the minimum threshold for a given location, the system continues to the next step.

At step F14f, the Access Control & Location Tracking System begins a timer to determine the length of time that a member or guests wireless radio, sound and/or light enabled device is transmitting a received signal strength from the wireless radio, sound and/or light-based beacon(s) above the minimum signal strength threshold. If the received signal strength falls below the minimum threshold before the minimum duration has elapsed, the Access Control & Location Tracking System will continue to scan for signals or transmissions from the member or guests wireless radio, sound and/or light enabled device and will make similar signal strength and/or duration determinations for subsequent signals/transmissions it receives. If the received signal strength is above the minimum threshold for a given location, the system will request that the digital key be sent by the member or guests wireless radio, sound and/or light enabled device to the access control & location tracking system.

At F14g, the member or guests wireless radio, sound and/or light enabled device transmits the digital key to the Access Control & Location Tracking System. It can then grant or deny access based upon the configured permissions for the particular member or guest. The access control & location tracking database can also be updated by the access control & location tracking system regarding valid and/or invalid signal determinations made by the access control & location tracking system The system that performs the above described functions and steps for FIGS. 1 through 14 can include several components including, but not necessarily limited to:
1. One or more Wireless Radio, Sound and/or Light-based Beacon(s)
2. One or more member/guest electronic computer system or device(s)
3. Access Control & Location Tracking System
4. Access Control & Location Tracking System Database
5. Access Control & Location Tracking Keychain Database
6. A public or private computer network to connect or communicate the beacons and Access Control & Location tracking system and database with each other.

The various components can be in electrical and wireless communication with each other.

The ability to electronically monitor guest and member access to controlled areas will provide significant administrative and financial benefits incident to operators of controlled access locations. Without limitation, these include the following benefits:
1. Provide members with the ability to remotely allow guests entry, rather than necessitating the transfer of a physical object such as a keycard or conventional mechanical key.
2. Provide guests with real-time mapping and navigation in buildings and neighborhoods.
3. Allow members to confirm their guests have arrived and departed.
4. Reduce security costs by allowing increased automation of security systems.
5. Increase safety in controlled access locations by providing real-time data on the presence of unauthorized persons.
6. Provide public safety personnel with access to controlled locations in emergency or other necessary situations.

FIG. 15 shows one method for allowing a user to register their computer system or device with the electronic location identification and tracking system of or associated with a particular location, company or business. This initial process allows a user to be electronically and automatically tracked within the location, utilize navigation services, order services delivered to their location and receive advertising and other location pertinent and/or aware messaging among other possible uses.

At F15a, a customer downloads and installs the Electronic Location Identification Tracking System Application "App" from their computer or any app store or marketplace including, but not limited to, the Apple App Store, Windows Store and Google Play marketplace. The App is downloaded to the customer's electronic system or device. Alternatively, the customer's electronic device can be purchased or otherwise obtained by the customer with the App already installed/loaded. The App can be a single App per location/company or an App that can work across multiple companies/locations. As a non-limiting example, a hotel chain can have a single app for its customers to use at all of its different locations while a small retail store may choose to have an app for just its single location. Partnerships for multiple companies can also be implemented, where a single App can work seamlessly for all of their stores/establishments.

At F15b, when the App is first opened, it can prompt the user to register their electronic computer system or device with the electronic location identification and tracking system/database. This enables the customer to use their computer system or device to be automatically tracked within the customer's facility, communicate with the company, and order food, beverage or other products/services. Where the customer is interested in ordering food, beverage and/or other products or services, a menu or listing of the food, beverage and other products/services offered at the location can be displayed on the customer's electronic system or device to inform the customer of what is available at the location. If the user opens the App and does not wish to register the device, then the App will operate in a non-registered mode that can also limit the services available on the device.

At F15c, if the customer would like to register the device with the electronic location identification and tracking system, a form will appear on the screen prompting the customer for information, which can include, but is not limited to, one or more of the following: their name, birthday, mailing address, email address, phone number and picture. The system and software can also be designed such that multiple electronic systems and devices are associated with one account so that the rewards given to each electronic system or device are accumulated within one account (i.e. multiple devices belong to a single user can all be used to identify and track that user such as smartphones, smart watches, fitness bands, RFID badges, wearable beacons, wristbands, etc.). The required fields can be selected by the company and can depend on the specific company and needs of that company. The user electronically submits the form when completed.

At F15d, if during submission by the user, the App determines that not all required fields are filled out, it can prompt the customer for the missing information. The user can resubmit the form with the missing information provided.

At F15e, once all required fields are provided and the form is electronically submitted by the user, the data is electronically sent to and received by the electronic location identification and tracking system.

At F15f, the electronic location identification and tracking system stores the user's form submissions along with some identifying information for the user's device such as, but not limited to, one or more of the following: the device's name and/or device's owner's name, a universally unique identifier or UUID (an identifier standard used in software construction and is a 128-bit value), media access control address or MAC address (unique identifier assigned to network interfaces for communications on the physical network segment), IP Address, or other unique identifiers.

At F15g, an electronic notification can be sent to the system administrator(s) via email, sms, mms, voice, fax or other electronic method of the new user registration.

At F15h, the system administrator can access the electronic location identification and tracking system to view and edit the new customer's profile. The system administrator can assign the user to any group or list available, or add information about the user in its profile.

At F15i, any edits or additions to the user's profile made by the system administrator can be stored in the electronic location identification and tracking system database.

FIG. 16 illustrates how a location is registered with the electronic location identification and tracking system.

At F16a, a system administrator configures either a single or cluster of wireless radio, sound and/or light-based beacon(s) with information including, but not limited to, one more of the following: its name, unique identifier (MAC Address, UUID or similar), group/organization, unique number within an organization, location, wireless networks, etc. A cluster of beacons is created when two or more beacons are grouped together to define a single location and can include different types and technologies of beacons. As non-limiting examples, a beacon cluster may consist of 3 bluetooth beacons and a LiFi beacon in one location but consist of 2 bluetooth beacons and an Ultrasonic beacon in another location. The system administrator can select various options with regards to what the system should do when it does not receive a signal from a beacon assigned to a given location cluster. Options include but are not limited to discarding this location from presence determination if a signal from all beacons configured for the cluster is not received, assigning a default or static value for the beacon signal strength for any beacon that is assigned to this cluster but the system didn't receive a signal from, or ignoring the beacon from consideration in presence determination. Location determination for a cluster of beacons can be preferably based on an average of the signal strength received by a device from all of the beacons assigned to a given cluster of a location and subject to the options specified above for any missing signals. Preferably, the clustering method can be designed to enable micro-location services (i.e. be able to provide accurate location at a sub-room level). In one non-limiting example, the distances of the clusters can range from about a few feet radius to about a 15 feet radius. The beacons can be placed anywhere from right next to or adjacent to each other up to a few feet apart, depending on the level of accuracy needed for the given use. Clusters can be defined from a logical perspective as a specific location. From a technical perspective, the beacon clusters can, as a non limiting example, be defined by using their UUID, Major and Minor values (identifiers). All beacons in a cluster preferably having the same UUID and Major value, with each beacon in the cluster having a unique minor value, though this is not considered limiting and other value configurations can be used.

At F16b, the configured wireless radio, sound and/or light-based beacon(s) are physically installed at the configured location and can be tested to ensure its operability.

At F16c, a system administrator then electronically accesses the electronic location identification and tracking system to enter in the installed wireless radio, sound and/or light-based beacon(s)' configuration and location information. Beacon clusters can be defined at this point as well. When a location is created, the user inputs the number of beacons used to define that specific location. When a cluster of beacons is configured for a location, the system will use the average of the received signal strengths for all beacons in a cluster in determining location or presence at a location. As a non-limiting example, if a location is configured for a cluster of 3 beacons, the signal strength received from each of the beacons is averaged to create a single location signal strength value. Optionally, should a beacon signal not be received for any given beacon assigned to a location cluster, the system can either assign a dummy value to this beacon signal or choose to ignore all beacons for this location. Additional configuration of the beacon(s) can also be performed at this step, which can include, but is not limited to, configuring notification settings, signal types, signal strengths, transmission power and device presence durations.

At F16d, the wireless radio, sound and/or light-based beacon's configuration and location information is stored in the electronic location identification and tracking system database.

FIG. 17 illustrates one embodiment of how the system determines the location of a user and their presence at any given location based on their registered device.

At F17a, the wireless radio, sound and/or light-based beacons installed at various locations are preferably constantly and automatically broadcasting their information including, but not limited to, one or more of the following: its name, unique identifier (MAC Address, UUID or similar), group/organization, unique number within an organization, location, wireless networks, etc.

At F17b, the user's electronic system or device with the electronic identification and location tracking system application "App" downloaded and running (either in the foreground or as a background service) receives the broadcasted information from the wireless radio, sound and/or light-based beacons including, but not limited to, one or more of the following: its name, unique identifier (MAC Address, UUID or similar), group/organization, signal type and strength. If the beacon contains a recognized identifier as programmed into the App, it proceeds to step F17c. Otherwise, the App will continue to monitor for known beacon signals and ignore any other beacons present that are not registered or designed to be used with the system. This process repeats at configurable intervals so that the App can be frequently receiving beacon information.

At F17c, when a known beacon signal is received by the App, its database is queried to determine the location properties of the known beacon whose signal was received. This will include but is not limited to the type and number of beacons associated with the location assigned to the particular beacon.

At F17d, the User/Customer's system/App ("system/App") makes a determination based on the information returned in F17c if a signal was received from all beacons assigned to a location or locations, if multiple beacons are discovered. If signals from all beacons assigned to a location are received, the system proceeds to step F17e. If a signal was not received from all beacons in a location cluster, the system/App applies the programmed and configured logic for handling the missing beacons. This may include, but is not limited to, ignoring the location in its entirety if all beacons are not found, using a static value for the missing beacons or simply ignoring the missing beacons and calculate the average using just the beacons whose signals were received.

At F17e, if the analysis performed in F17d indicates that the user's device is near a given location, the system/App determines whether the device is in close enough proximity to the beacons to be considered present at that specific area of a location. It does this by comparing the average signal strength received for the beacons at the location to the configured minimum. If the average signal strength is below the configured value, the system will continue to perform the average signal strength calculations in F17d. If the average signal strength is above the configured minimum value, the system proceeds to step F17f. This step can be optional and the system can be configured to simply determine a user's location based on the highest average signal strength value from the beacon clusters.

At F17f, the system/App begins counting to see if the user's device with the app running is maintaining its average signal strength for longer then a configured duration for that location. If the average signal strength for the location cluster fails to remain above the configured minimum threshold for greater then a configured period of time, the system will continue to perform the average signal strength calculations in F17d. If the system/App determines that the average signal strength for a location cluster is maintained above a configured threshold for longer then a configured period of time, then it will notify the Electronic Identification & Location Tracking system of the user's confirmed presence at the given location.

At F17g, the electronic identification & location tracking system stores the user's location and other information in its database.

FIG. 18 illustrates another embodiment of how the system determines the location of a user and their presence at any given location based on their registered device.

At F18a, the wireless radio, sound and/or light-based beacons installed at various locations are constantly and automatically broadcasting their information including, but not limited to, one or more of the following: its name, unique identifier (MAC Address, UUID or similar), group/organization, unique number within an organization, location, wireless networks, etc.

At F18b, the user's electronic system or device with the electronic identification and location tracking system application "App" downloaded and running (either in the foreground or as a background service) receives the broadcasted information from the wireless radio, sound and/or light-based beacons including, but not limited to one or more of the following: its name, unique identifier (MAC Address, UUID or similar), group/organization, signal type and strength. If the beacon contains a recognized identifier as programmed into the App, it proceeds to step F18c. Otherwise, the App will continue to monitor for known beacon signals. This process repeats at configurable intervals so that the App can be frequently receiving beacon information.

At F18c, when a known beacon signal is received by the system/App, it sends the information received from the beacon including but not limited to, one or more of the following: its name, unique identifier (MAC Address, UUID or similar), group/organization, signal type and strength to the electronic identification and location tracking system. The electronic identification and location tracking system queries its database to determine the location properties of the known beacon whose signal was received. This can include, but is not limited to, the type and number of beacons associated with the location assigned to the particular beacon and the configured logic for what to do when the system doesn't receive a signal from one or more beacons (or type of beacons) in a location cluster.

At F18d, the electronic identification and location tracking system makes a determination based on the information returned in F18c if a signal was received from all beacons assigned to a location or locations, if multiple beacons are discovered. If signals from all beacons assigned to a location are received, the system proceeds to step F18e. If a signal was not received from all beacons in a location cluster, the system applies the programmed and configured logic for handling the missing beacons. This may include, but is not limited to, ignoring the location in its entirety if all beacons are not found, using a static value for the missing beacons or simply ignoring the missing beacons and calculate the average using just the beacons whose signals were received.

At F18e, if the analysis performed in F18d indicates that the user's device is near a given location, the system/App determines whether the device is in close enough proximity to the beacons to be considered present at that specific area of a location. It does this by comparing the average signal strength received for the beacons at the location to the configured minimum. If the average signal strength is below the configured value, the system will continue to perform the average signal strength calculations in F18d. If the average signal strength is above the configured minimum value, the system proceeds to step F18f. This step can be optional and the system can be configured to simply determine a user's location based on the highest average signal strength value from the beacon clusters.

At F18f, the system/App begins counting to see if the user's device with the app running is maintaining its average signal strength for longer then a configured duration for that location. If the average signal strength for the location cluster fails to remain above the configured minimum threshold for greater then a configured period of time, the system will continue to perform the average signal strength calculations in F18d. If the system determines that the average signal strength for a location cluster is maintained above a configured threshold for longer then a configured period of time, then it will notify the Electronic Identification & Location Tracking system of the user's confirmed presence at the given location.

At F18g, the electronic identification & location tracking system stored the user's location and other information its database.

FIG. 19 demonstrates how a user's presence at a location is determined and configured within the electronic identification & location tracking system. This process can also be utilized to edit presence determination configurations already stored in the database.

At F19a, the electronic identification & location tracking system queries the electronic identification & location tracking system database for a list of available locations. Available locations can be ones that are entered into the system database as described above. Configuring refers to setting parameters for a location to assign a beacon or beacon cluster to a particular location as well as to aid in the determination of a customer/user's presence at that location based on signal strength and duration. This function can be typically reserved for a system administrator.

At F19b, the electronic identification & location tracking system displays a listing of available locations to configure. The system administrator can then select the location to configure or edit the configuration of. Reconfiguring the location can be for a variety of reasons, such as, but not limited to, adding additional beacons to a location cluster for better accuracy, replace a beacon that is faulty, or changing the presence determination criteria to make the system more or less sensitive/accurate. The system administrator may also elect to configure a new location in the manner.

At F19c, once the location is selected, the system administrator may now specify the number and type of beacons assigned to this particular location. A location can consist of one or more beacons, clustered together (i.e. where more than one beacon designated for the location) utilizing the same or different technologies. As a non-limiting example, a beacon cluster can consist of three beacons made up of IR, Bluetooth and Ultrasonic beacons that work in conjunction.

At F19d, next, the system administrator may now specify the Unique Identifiers for the beacons to be identified with this location. As a non-limiting example, if three beacons are configured for this location cluster, then 3 beacon identifiers should be selected to belong to this location cluster. If only a single beacon is selected then a single unique identifier is assigned to this location. Locations can be identified by using matching identifiers on the beacons with only a single differentiator. In one non-limiting embodiment, 3 identifying fields can be used for each beacon, UUID, Major Value and Minor Value. Each beacon can have values assigned to each of those 3 fields. As a non-limiting example, a 3 beacon cluster could have each beacon with a UUID of 121324-34235-342345-34423 and a major id value of 12345. Then beacon 1 in the cluster could have a minor value of 1, beacon 2 could have a minor value of 2 and beacon 3 could have a minor value of 3. The next cluster could have 3 beacons with the same UUID as above but with a different major value and a similar minor value structure as the previous location.

At F19e, next, the system administrator may now select what the system should do when it does not receive a signal from a beacon assigned to a given location cluster. Options can include, but are not limited to, discarding this location from presence determination if a signal from all beacons configured for the cluster is not received, assigning a default or static value for the beacon signal strength for any beacon that is assigned to this cluster but didn't receive a signal, or ignoring the beacon from consideration in presence determination.

At F19f, next, the system administrator may now specify the minimum signal strength threshold for a user to be considered present at this particular location. This signal strength is the measure of the strength of a known wireless radio, sound and/or light-based beacons transmitted signal strength as received by the customer's electronic system or device. As a non-limiting example, the signal strength can be measured and calculated on a scale of 0 to 100% where the minimum signal strength threshold is set to 80%. This means that unless the customer's device receives a signal from the wireless radio, sound and/or light-based beacons greater then the 80% strength threshold, they will not be considered present at a location. Though it is preferred that the beacons are of the same type for a particular cluster, it is within the scope of the disclosure to have a location cluster made up beacons of differing types (i.e. Bluetooth beacon, a light-based beacon and a sound based beacon). The signal strength measurement is intended to approximate the distance between the user's electronic system or device and the wireless radio, sound and/or light-based beacons and can also include strength indicators including but not limited to RSSI (relative signal strength indicator) values. This setting can be optional.

At F19g, once the minimum presence signal strength threshold has been entered, the system administrator has the option of specifying the minimum presence duration for that location. The minimum presence duration can be a time value and can be expressed in any known and acceptable time format including but not limited to milliseconds, seconds, minutes and hours. As a non-limiting example, the system administrator can configure the value to 20 seconds. In this instance the user's electronic system or device must report to the electronic identification & location tracking system a signal strength above the minimum threshold specified in F5f for a period of at least 20 consecutive seconds in order to consider the user's electronic system or device present at that location. This setting can be optional.

At F19h, next the system administrator may now specify the signal strength threshold for a user to be considered to have departed from this particular location. This signal strength is the measure of the strength of a known wireless radio, sound and/or light-based beacons transmitted signal strength as received by the customer's electronic system or device. As a non-limiting example, the signal strength can be measured and calculated on a scale of 0 to 100% where the maximum signal strength threshold is set to 40%. This means that once the customer's device receives a signal from the wireless radio, sound and/or light-based beacons lower then the 40% strength threshold, they will not be considered present at a location. The signal strength measurement is intended to approximate the distance between the users electronic system or device and the wireless radio, sound and/or light-based beacons and can also include strength indicators including but not limited to RSSI (relative signal strength indicator) values. This setting can be optional. As a non-limiting example, signal strength can be measured in terms of decibels or RSSI. For decibels, the receiving device (phone, tablet, etc.) can simply measure the signal strength in db. Also, a fixed value can be configured for the transmit power strength of the beacons and that power level (in db) can be used in the calculation of the RSSI which is an industry standard measurement algorithm that factors in the received signal strength in db and compares it against the known transmit power. Other potential forms of signal strength measurement that can be used include, but are not limited to Lux (light levels for light-based beacons), decibels in terms of volume (sound based-beacons) and magnetic fields strength.

At F19i, once the departure signal strength threshold has been crossed, the system administrator has the option of specifying the minimum departure duration for that location. The minimum departure duration is a time value and can be expressed in any known and acceptable time format including, but not limited to, milliseconds, seconds, minutes and hours. As a non-limiting example, the system administrator can configure the value to 20 seconds. In this instance the user's electronic system or device reports to the electronic identification & location tracking system a signal strength below the threshold specified in F5h for a period of at least 20 consecutive seconds in order to consider the user's electronic system or device to have departed that location. This setting can be optional.

At F19j, the locations presence determination configuration profile can be updated in the electronic identification & location tracking system database.

FIG. 20 demonstrates how a customer is able to opt-out of being tracked/monitored from within the electronic identification & location tracking system application on the user's electronic system or device.

At F20a, when the electronic identification & location tracking system makes a determination that a user's electronic system or device is present at a given location as described in FIGS. 3 and/or 4, a notification can be sent to the user's electronic system or device via the electronic identification & location tracking system application "App" indicating that their presence has been detected at a given location by the electronic identification & location tracking system. The notification can be made through a variety of methods including but not limited to Email, SMS, MMS, On Screen and Voice.

At F20b, the customer through the App running on their electronic system or device is presented with or can select a menu item to opt-out of being tracked/monitored by the facility. If the customer does not make an affirmative selection to opt-out of being tracked/monitored or makes an affirmative selection to allow tracking/monitoring, then the electronic identification & location tracking system is electronically notified so that user tracking/monitoring can continue.

At F20c, if the user makes an affirmative selection to Opt-Out of being tracked/monitored, then the electronic identification & location tracking system is electronically notified of such selection.

At F20d, the electronic identification & location tracking system updates the electronic identification & location tracking system database of the users' selection in F20b or F20c.

FIG. 21 demonstrates one non-limiting embodiment/example of how a cluster of beacons can be assigned to a location and used for location determination within the electronic identification & location tracking system.

At F21a, beacons are installed and configured for six locations, Bedroom 1 ('A' Beacons), Bedroom 2 ('B' Beacons), Hall ('C' Beacons), Kitchen ('D' Beacons), Dining Room ('E' Beacons) and Living Room ('F' Beacons). Though not limiting, each location has 3 beacons configured in the cluster.

At F21b, a user with the electronic identification & location tracking system application "App" on the users' electronic system or device enters Bedroom 2 ('B' Beacons) as illustrated.

At F21c, the electronic identification & location tracking system application "App" on the user's electronic system or device receives beacon signals from all nearby beacons and sends them to the electronic identification & location tracking system. As a non-limiting example, the signal strength measurements for each beacon are displayed in the chart on the figure. Also seen in the chart for F21c is the signal average for each location/beacon cluster calculated by the electronic identification & location tracking system, which can be all of the beacon signal strengths received for each location.

At F21d, the electronic identification & location tracking system makes a determination the user's location of Bedroom 2 ('B' Beacons) based on a higher average signal strength received from the beacons in the Bedroom 2 location cluster then the average signal strength received from the beacons in the other location clusters.

FIG. 22 illustrates a further non-limiting embodiment for the determination of presence at a location. As seem, the system can determine the location of a user and their presence at any given location based on their registered device.

At F22a, the wireless radio, sound and/or light-based beacons installed at various locations are preferably constantly and automatically broadcasting their information including, but not limited to, one or more of the following: its name, unique identifier (MAC Address, QUID or similar), group/organization, unique number within an organization, location, wireless networks, etc.

At F22b, the user's electronic system or device with the electronic identification and location tracking system application "App" downloaded (or otherwise installed) and running (either in the foreground or as a background service) receives the broadcasted information from the wireless radio, sound and/or light-based beacons including, but not limited to, one or more of the following: its name, unique identifier (MAC Address, UUID or similar), group/organization, signal type and strength. If the beacon contains a recognized identifier as programmed into the App, it can proceed to step F22c. Otherwise, the App will continue to monitor for known beacon signals and ignore any other beacons present that are not registered or designed to be used with the system. This process can repeat at configurable intervals so that the App can be frequently receiving beacon information.

At F22c, when a known beacon signal is received by the App, its database can be queried to determine the location properties of the known beacon whose signal was received. This can include, but is not limited to, the type and minimum number of beacons associated with the location, group of locations, or globally all locations configured within the system.

At F22d, the User/Customer's system/App ("system/App") makes a determination based on the information returned in F22c if a signal was received from the minimum number of beacons assigned to a location or locations. If signals from the minimum number of beacons assigned to a location, group of locations or globally all locations are received, the system proceeds to step F22e. If a signal was not received from the minimum number of beacons in a location cluster, the system/App applies the programmed and configured logic for handling the missing beacons. This may include, but is not limited to, ignoring the location in its entirety if all beacons are not found, using a static value for the missing beacons or simply ignoring the missing beacons and calculate the average using just the beacons whose signals were received.

At F22e, the system/App performs calculations for average signal strengths for all locations it received beacons for after applying the system/app login in F22d. The beacon(s) with the highest average signal strength can then be sent to the Electronic Identification & Location Tracking System.

At F22f, the Electronic Identification & Location Tracking System queries its database to determine the identity of the location associated with the received beacon(s) from F22e. At this point, the location can be determined and stored in the database. Optionally, the process may continue to F22g to provide further options for determining location of the user.

At F22g, The Electronic Identification & Location Tracking System may make a further determination as to whether the device is in close enough proximity to the beacons to be considered present at that specific area of a location. It does this by comparing the average signal strength received for the beacon(s) received from F22e to the configured minimum signal strength. If the average signal strength is below the configured value, the system will determine that the user is not in close enough proximity to the beacons to be considered present at that specific location and the process will begin again at F22a. If the average signal strength is above the configured minimum value, the system proceeds to step F22h. This step can be optional and the system can be configured to simply determine a user's location based on the highest average signal strength value from the beacon clusters.

At F22h, The Electronic Identification & Location Tracking System may make a further determination as to whether the device is in close enough proximity to the beacons to be considered present at that specific area of a location. It does this by counting to see if the user's device with the app running is maintaining its average signal strength for the given beacon(s) for longer than a configured duration for that location. If the average signal strength for the location cluster fails to remain above the configured minimum threshold for greater then a configured period of time, the system will determine that the user is not in close enough proximity to the beacons to be considered present at that specific location and the process will begin again at F22a. If the average signal strength for the location cluster remains above the configured minimum threshold for greater then a configured period of time, the system determines the User to be in location assigned the beacon cluster and stores the user's location and other information in its database. This step can be optional and the system can be configured to simply determine a user's location based on the highest average signal strength value from the beacon clusters.

FIG. 23 illustrates another non-limiting embodiment for the determination of presence at a location. As seen the system can determine the location of a user and their presence at any given location based on their registered device.

At F23a, the wireless radio, sound and/or light-based beacons installed at various locations are preferably constantly and automatically broadcasting their information including, but not limited to, one or more of the following: its name, unique identifier (MAC Address, UUID or similar), group/organization, unique number within an organization, location, wireless networks, etc.

At F23b, the user's electronic system or device with the electronic identification and location tracking system application "App" downloaded (or otherwise installed) and running (either in the foreground or as a background service) receives the broadcasted information from the wireless radio, sound and/or light-based beacons including, but not limited to, one or more of the following: its name, unique identifier (MAC Address, UUID or similar), group/organization, signal type and strength. If the beacon contains a recognized identifier as programmed into the App, it proceeds to step F23c. Otherwise, the App will continue to monitor for known beacon signals and ignore any other beacons present that are not registered or designed to be used with the system. This process repeats at configurable intervals so that the App can be frequently receiving beacon information.

At F23c, when a known beacon signal is received by the App, its database is queried to determine the location properties of the known beacon whose signal was received. This can include, but is not limited to, the type, minimum number of beacons, minimum signal strength and minimum signal duration associated with the location, group of locations, or globally all locations configured within the system.

At F23d, the User/Customer's system/App ("system/App") makes a determination based on the information returned in F23c if a signal was received from the minimum number of beacons assigned to a location or locations. If signals from the minimum number of beacons assigned to a location, group of locations or globally all locations are received, the system can proceed to step F23e. If a signal was not received from the minimum number of beacons in a location cluster, the system/App applies the programmed and configured logic for handling the missing beacons. This may include, but is not limited to, ignoring the location in its entirety if all beacons are not found, using a static value for the missing beacons or simply ignoring the missing beacons and calculate the average using just the beacons whose signals were received.

At F23e, the system/App performs calculations for average signal strengths for all locations it received beacons for after applying the system/app login in F23d. The system/App may at this point make a determination as to its location based on the identity of the location associated with the received beacon(s) having the highest computed average signal strength with the process continuing to F23h. Optionally, the process may continue to F23f to provide further options for determining location of the user.

At F23f, system/App may make a further determination as to whether the device is in close enough proximity to the beacons to be considered present at that specific area of a location. It does this by comparing the computed average signal strength received for the beacon(s) determined in F23e to have the highest average signal strength to the configured minimum signal strength for the location cluster. If the average signal strength is below the configured value, the system will determine that the user is not in close enough proximity to the beacons to be considered present at that specific location and the process will begin again at F23a. If the average signal strength is above the configured minimum value, the system proceeds to step F23g. This step can be optional and the system can be configured to simply determine a user's location based on the highest average signal strength value from the beacon clusters.

At F23g, the system/App may make a further determination as to whether the device is in close enough proximity to the beacons to be considered present at that specific area of a location. It does this by counting to see if the user's device with the system/App running is maintaining its average signal strength for the given beacon(s) for longer than a configured duration for that location. If the average signal strength for the location cluster fails to remain above the configured minimum threshold for greater then a configured period of time, the system/App will determine that the user is not in close enough proximity to the beacons to be considered present at that specific location and the process will begin again at F23a. If the average signal strength for the location cluster remains above the configured minimum threshold for greater then a configured period of time, the system/App determines the User to be in location assigned to the beacon cluster. This step can be optional and the system can be configured to simply determine a user's location based on the highest average signal strength value from the beacon clusters.

At F23h, the Electronic Identification & Location Tracking System can receive the User's information which can include, but is not limited to, the User's Id, name, location, date and time. The system can preferably store the user's location and other information in its database.

The system that performs the above described functions and steps can include several components including, but not necessarily limited to, the following:
1. One or more Wireless Radio, Sound and/or Light-based Beacon(s)
2. One or more user/customer electronic computer system or device(s)
3. Electronic Identification & Location Tracking System
4. Electronic Identification & Location Tracking System Application "App"
5. Electronic Identification & Location Tracking System Database
6. Electronic Identification & Location Tracking System Application "App" Database
7. A public or private computer network to connect or communicate the user's device, beacons and Electronic Identification & Location Tracking System and database with each other.

The various components can be in electrical and wireless communication with each other.

The ability to electronically identify users, track user movements and identify presence at a location can provide significant administrative and financial benefits incident to operators of venues where traditional GPS location services are not available. Without limitation, these include the following benefits:
1. Provide venue operators the ability to identify a user and the user's precise location within their facility.
2. Provide venue operators the ability to determine a user's presence at a location through configurable parameters.
3. Provide venue operators with product and/or service delivery capabilities to a user's real-time location.
4. Provide users with real-time mapping and navigation in buildings and other venues.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from their spirit and scope.

All components of the described system and their locations, electronic communication methods between the system components, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed or considered as a critical, required, or essential features or elements of any or all the claims.

While the system and method has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A method for determining a presence of a user at a particular area within a location, said method comprising the steps of:
    (a) electronically receiving one or more signals containing identification information from at least one wireless beacon associated with a particular area within a location by a user's portable electronic device running an electronic location identification and tracking system application ("App");
    (b) electronically querying a database to electronically receive location properties for each beacon of the at least one wireless beacon, wherein the location properties include information on the number and identity of beacons grouped as a particular cluster of beacons for a particular area within the location; and
    (c) electronically determining by the App if a signal was received from each beacon associated with the particular cluster of beacons.

2. The method for determining a presence of a user of claim 1 wherein if a signal was received from each beacon associated with the particular cluster of beacons, further comprising the steps of: (d) electronically receiving a signal strength for each beacon signal received; (e) electronically determining an average signal strength from all of the signal strengths received in step (d); and (f) electronically comparing the average signal strength to a preconfigured minimum signal strength value for the particular area or particular cluster of beacons.

3. The method for determining a presence of a user of claim 2 wherein if the average signal strength is above the preconfigured minimum signal strength value the user is considered present at the particular area within the location associated with the particular cluster of beacons.

4. The method for determining a presence of a user of claim 2 wherein where the average signal strength is above the preconfigured minimum signal strength value further comprising the step of electronically determining if the average signal strength remains above the preconfigured minimum signal strength value for a preconfigured period of time.

5. The method for determining a presence of a user of claim 1 wherein if a signal was not received from each beacon associated with the particular cluster of beacons in step (c) further comprising the step of either (i) using a static value for any missing beacon when calculating an average signal strength for the beacon signals of the beacons associated with the particular cluster of beacons, or (ii) calculating the average signal strength from the beacon signals received from the beacons associated with the particular cluster of beacons.

6. The method for determining a presence of a user of claim 3 further comprising the step of storing a determined location for the user in an electronic database.

7. A method for determining a presence of a user at a particular area within a location, said method comprising the steps of:
(a) electronically receiving one or more signals containing identification information from at least one wireless beacon associated with a particular area within a location by a user's portable electronic device running an electronic location identification and tracking system application ("App");
(b) electronically querying a database to electronically receive location properties for each beacon of the at least one wireless beacon, wherein the location properties include information on the number and identity of beacons grouped as a particular cluster of beacons for a particular area within the location; and
(c) electronically determining if the user was or is at the particular area within the location by the App or an electronic location identification and tracking system based on the one or more signals received in step (a).

8. The method for determining a presence of a user of claim 7 wherein if a signal was received from each beacon associated with the particular cluster of beacons then step (c) comprises the steps of: (i) electronically receiving a signal strength for each beacon signal received; (ii) electronically determining an average signal strength from all of the signal strengths received; and (iii) electronically comparing the average signal strength to a preconfigured minimum signal strength value for the particular area or particular cluster of beacons.

9. The method for determining a presence of a user of claim 8 wherein if the average signal strength is above the preconfigured minimum signal strength value the user is considered present at the particular area within the location associated with the particular cluster of beacons.

10. The method for determining a presence of a user of claim 8 wherein where the average signal strength is above the preconfigured minimum signal strength value further comprising the step of electronically determining if the average signal strength remains above the preconfigured minimum signal strength value for a preconfigured period of time.

11. The method for determining a presence of a user of claim 7 wherein if a signal was not received from each beacon associated with the particular cluster of beacons then step (c) comprises the step of either (i) using a static value for any missing beacon when calculating an average signal strength for the beacon signals of the beacons associated with the particular cluster of beacons, or (ii) calculating the average signal strength from the beacon signals received from the beacons associated with the particular cluster of beacons.

12. The method for determining a presence of a user of claim 11 wherein if the average signal strength is above the preconfigured minimum signal strength value the user is considered present at the particular area within the location associated with the particular cluster of beacons.

13. The method for determining a presence of a user of claim 11 wherein where the average signal strength is above the preconfigured minimum signal strength value further comprising the step of electronically determining if the average signal strength remains above the preconfigured minimum signal strength value for a preconfigured period of time.

14. A method for determining a presence of a user at a particular area within a location, said method comprising the steps of:
(a) electronically receiving one or more signals from a plurality of beacons associated with a location by a user's portable electronic device running an electronic location identification and tracking system application ("App");
(b) electronically querying a database to electronically receive location properties for each beacon of the plurality of beacons, wherein the location properties include information on which beacons of the plurality of beacons are grouped together as a particular cluster of beacons for a particular area within the location; and
(c) electronically determining which particular area within the location that the user was or is currently at by the App or an electronic location identification and tracking system based on the one or more signals received in step (a).

15. The method for determining a presence of a user of claim 14 wherein if a signal was received from each beacon associated with the particular cluster of beacons then step (c) comprises the steps of: (i) electronically receiving a signal strength for each beacon signal received; (ii) electronically determining an average signal strength from all of the signal strengths received; and (iii) electronically comparing the average signal strength to a preconfigured minimum signal strength value for the particular area or particular cluster of beacons.

16. The method for determining a presence of a user of claim 15 wherein if the average signal strength is above the preconfigured minimum signal strength value the user is considered present at the particular area within the location associated with the particular cluster of beacons.

17. The method for determining a presence of a user of claim 15 wherein where the average signal strength is above the preconfigured minimum signal strength value further comprising the step of electronically determining if the average signal strength remains above the preconfigured minimum signal strength value for a preconfigured period of time.

18. The method for determining a presence of a user of claim 14 wherein if a signal was not received from each beacon associated with the particular cluster of beacons then step (c) comprises the step of either (i) using a static value for any missing beacon when calculating an average signal strength for the beacon signals of the beacons associated with the particular cluster of beacons, or (ii) calculating the average signal strength from the beacon signals received from the beacons associated with the particular cluster of beacons.

19. The method for determining a presence of a user of claim 18 wherein if the average signal strength is above the preconfigured minimum signal strength value the user is considered present at the particular area within the location associated with the particular cluster of beacons.

20. The method for determining a presence of a user of claim 18 wherein where the average signal strength is above the preconfigured minimum signal strength value further comprising the step of electronically determining if the average signal strength remains above the preconfigured minimum signal strength value for a preconfigured period of time.

21. A method for determining a presence of a user at a particular area within a location, said method comprising the steps of:
   (a) electronically receiving one or more signals from a plurality of beacons associated with a location by a user's portable electronic device running an electronic location identification and tracking system application ("App"), wherein certain beacons of the plurality of beacons are grouped together as a particular cluster of beacons for a particular area within the location; and
   (b) electronically determining which particular area within the location that the user was or is currently at by the App or an electronic location identification and tracking system based on the one or more signals received in step (a).

22. The method for determining a presence of a user of claim 21 wherein if a signal was received from each beacon associated with the particular cluster of beacons then step (b) comprises the steps of: (i) electronically receiving a signal strength for each beacon signal received; (ii) electronically determining an average signal strength from all of the signal strengths received; and (iii) electronically comparing the average signal strength to a preconfigured minimum signal strength value for the particular area or particular cluster of beacons.

23. The method for determining a presence of a user of claim 22 wherein if the average signal strength is above the preconfigured minimum signal strength value the user is considered present at the particular area within the location associated with the particular cluster of beacons.

24. The method for determining a presence of a user of claim 22 wherein where the average signal strength is above the preconfigured minimum signal strength value further comprising the step of electronically determining if the average signal strength remains above the preconfigured minimum signal strength value for a preconfigured period of time.

25. The method for determining a presence of a user of claim 21 wherein if a signal was not received from each beacon associated with the particular cluster of beacons then step (b) comprises the step of either (i) using a static value for any missing beacon when calculating an average signal strength for the beacon signals of the beacons associated with the particular cluster of beacons, or (ii) calculating the average signal strength from the beacon signals received from the beacons associated with the particular cluster of beacons.

26. The method for determining a presence of a user of claim 25 wherein if the average signal strength is above the preconfigured minimum signal strength value the user is considered present at the particular area within the location associated with the particular cluster of beacons.

27. The method for determining a presence of a user of claim 25 wherein where the average signal strength is above the preconfigured minimum signal strength value further comprising the step of electronically determining if the average signal strength remains above the preconfigured minimum signal strength value for a preconfigured period of time.

* * * * *